US012713089B2

(12) United States Patent
Hou

(10) Patent No.: US 12,713,089 B2
(45) Date of Patent: Aug. 18, 2026

(54) METHODS AND SYSTEMS FOR AUTOMATED CONTENT GENERATION

(71) Applicant: Pluto Inc., West Hollywood, CA (US)

(72) Inventor: Vibol C. Hou, Long Beach, CA (US)

(73) Assignee: Pluto Inc., West Hollywood, CA (US)

( * ) Notice: Subject to any disclaimer, the term of this patent is extended or adjusted under 35 U.S.C. 154(b) by 0 days.

(21) Appl. No.: 18/666,558

(22) Filed: May 16, 2024

(65) Prior Publication Data

US 2024/0305854 A1 Sep. 12, 2024

Related U.S. Application Data

(63) Continuation-in-part of application No. 18/179,210, filed on Mar. 6, 2023, now Pat. No. 12,256,129.

(51) Int. Cl.
*H04N 21/431* (2011.01)
*H04N 21/466* (2011.01)

(52) U.S. Cl.
CPC ....... *H04N 21/431* (2013.01); *H04N 21/4668* (2013.01)

(58) Field of Classification Search
CPC ......................... H04N 21/431; H04N 21/4668
See application file for complete search history.

(56) References Cited

U.S. PATENT DOCUMENTS

| | | | | |
|---|---|---|---|---|
| 9,258,589 | B2 | 2/2016 | Grouf | |
| 9,699,515 | B2 | 7/2017 | Grouf | |
| 9,712,884 | B2 | 7/2017 | Grouf | |
| 9,762,971 | B1 | 9/2017 | Dodge | |
| 9,774,812 | B1 * | 9/2017 | Park | H04N 21/422 |
| 9,998,787 | B2 | 6/2018 | Grouf | |
| 10,231,018 | B2 | 3/2019 | Grouf | |
| 10,560,746 | B2 | 2/2020 | Grouf | |
| 11,831,938 | B1 * | 11/2023 | Poupard, III | H04N 21/2393 |
| 2003/0149981 | A1 | 8/2003 | Finster et al. | |
| 2005/0235314 | A1 | 10/2005 | Choi | |
| 2008/0235733 | A1 | 9/2008 | Heie | |
| 2008/0320523 | A1 | 12/2008 | Morris et al. | |
| 2009/0070819 | A1 | 3/2009 | Gajda | |
| 2009/0100466 | A1 | 4/2009 | Migos | |
| 2010/0053442 | A1 | 3/2010 | Kudo | |
| 2010/0071001 | A1 | 3/2010 | Hwang | |
| 2010/0169459 | A1 | 7/2010 | Biderman | |
| 2010/0272419 | A1 | 10/2010 | Wang | |
| 2011/0072105 | A1 | 3/2011 | Biderman | |
| 2011/0126258 | A1 | 5/2011 | Emerson | |
| 2012/0278838 | A1 | 11/2012 | Taxier | |
| 2012/0291056 | A1 * | 11/2012 | Donoghue | H04N 21/4722 725/41 |

(Continued)

*Primary Examiner* — Randy A Flynn
(74) *Attorney, Agent, or Firm* — Knobbe, Martens, Olson & Bear LLP

(57) ABSTRACT

An aspect of the disclosure related to methods and systems configured to distribute interactive media, such as videos, streamed or downloaded over a network and to enable efficient content discovery. An aspect relates to enabling a user to interactively navigate through representations of video content by drilling up to broader genre categories or down to narrower genre categories. An aspect relates to the generation of customized content from existing content using a learning engine and user characteristics. The learning engine may comprise a neural network.

21 Claims, 27 Drawing Sheets

(56) References Cited

U.S. PATENT DOCUMENTS

| | | | | |
|---|---|---|---|---|
| 2013/0080968 | A1* | 3/2013 | Hanson | H04N 21/4532 715/783 |
| 2013/0176244 | A1 | 7/2013 | Yamamoto | |
| 2013/0312041 | A1 | 11/2013 | Gresta | |
| 2014/0007170 | A1 | 1/2014 | Klappert | |
| 2016/0182923 | A1 | 6/2016 | Higgs | |
| 2016/0249116 | A1 | 8/2016 | Harb | |
| 2016/0360278 | A1 | 12/2016 | Moskowitz | |
| 2018/0150216 | A1* | 5/2018 | Choi | G06F 3/0412 |
| 2018/0152763 | A1* | 5/2018 | Barlaskar | H04N 21/4668 |
| 2019/0149885 | A1* | 5/2019 | Madison | H04N 21/4312 715/838 |
| 2020/0092590 | A1 | 3/2020 | Carpenter | |
| 2022/0286759 | A1* | 9/2022 | Doig-Cardet | H04N 21/8549 |
| 2022/0295147 | A1 | 9/2022 | Grouf et al. | |
| 2022/0303623 | A1 | 9/2022 | Grouf et al. | |
| 2022/0303624 | A1 | 9/2022 | Grouf et al. | |
| 2023/0013326 | A1 | 1/2023 | Hou | |
| 2023/0101680 | A1 | 3/2023 | Shanson et al. | |

* cited by examiner

FIG. 7E
New Title Based Off Clip #2

METHODS AND SYSTEMS FOR AUTOMATED CONTENT GENERATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention is related to content generation and content library navigation.

Description of the Related Art

Streaming media has become a central mechanism for delivering video content to users. Indeed, as of 2022, estimations have indicated that there were over 800,000 unique program titles in the U.S. alone, with many of those program titles including tens or hundreds of individual episodes or chapters. Although this massive number of available titles can be a boon to viewers, it also means that it can be exceedingly difficult to navigate among the titles to find content of interest.

Typically, a user may need to scroll through large numbers of screens of video programs, select a video program that appears to be of interest, play the selected video program, only to discover that the video program is not interesting to the user, and so the user needs to repeat the discovery process again. Not only is this conventional content discovery process frustrating to the user, this process consumes an inordinate amount of backend server resources (e.g., processor, memory, and network interface resources), as well as network bandwidth, in streaming what is unwanted video content to user devices. Further, this process requires large amounts of time-consuming navigation and scrolling by the user to view page after page of video content listings.

Certain conventional attempts to solve the foregoing discovery problems by providing a preview of a given item of content. However, the same preview is generally presented to all viewers, regardless of their interests. Further, often the previews simply consist of the very beginning of the program being previewed. In certain instances, a curator may manually select what the curator believes are the highlights of the program to generate a preview, and the same preview of so-called highlights are show to all viewers that are previewing the program, even though the selected highlights are unlikely to correspond to a given user's interests. Further, such previews are often conventional rendered in a relatively small window (e.g., a thumbnail), taking up only a small portion of a user device display, thereby not providing an adequate experience. Thus, a user may decide to stream a video program based on a standard preview only to discover the preview is not reflective of the user's interests and so may cease viewing the video program after having unnecessarily consumed computer and network resources.

Figure 1:
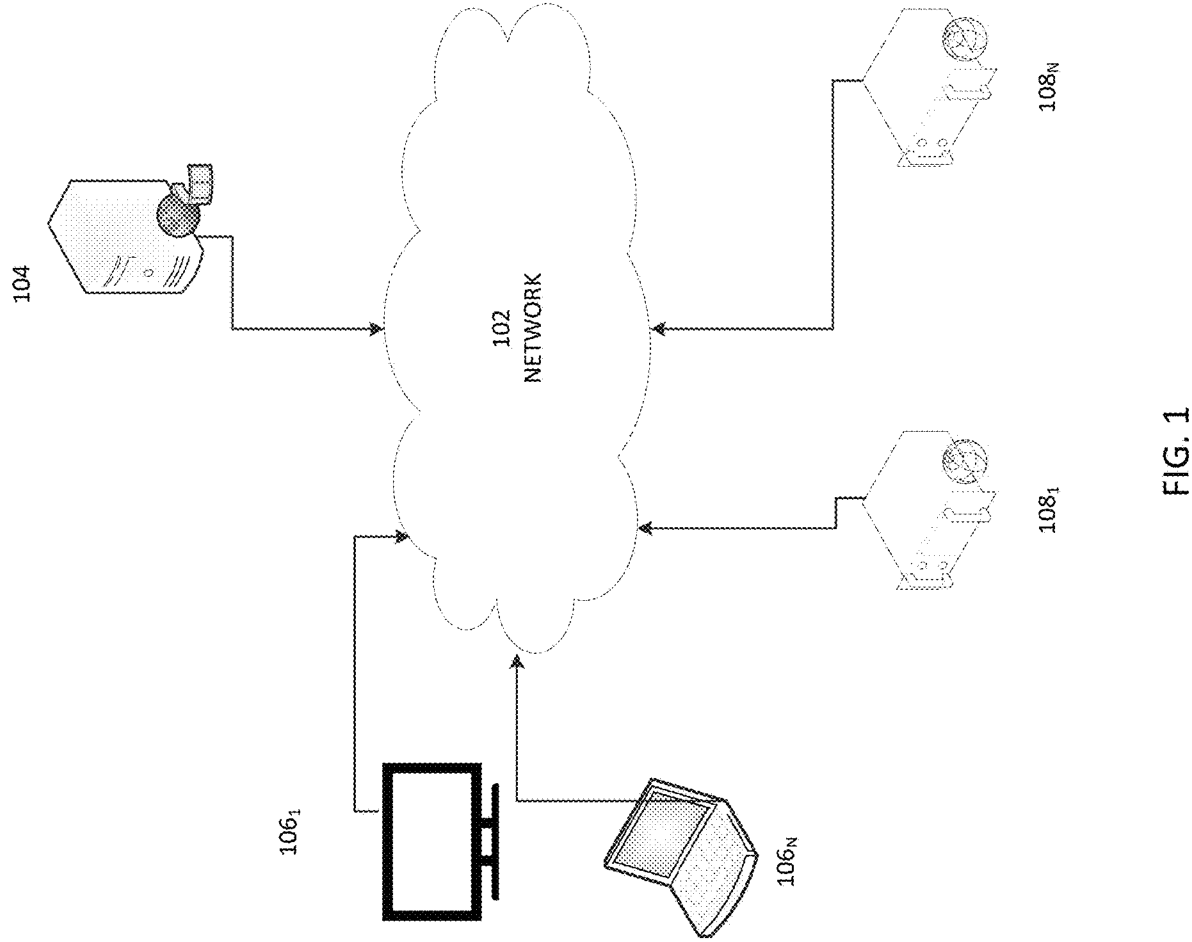
FIG. 1 illustrates an example environment.

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

The present disclosure describes systems and processes that overcome the above described technical problems as well as the drawbacks of conventional approaches.

An aspect of the present disclosure relates to an efficient content navigation interface that thereby reduces the amount of screen navigation needed to identify a program of interest, and thereby reducing the amount of computer and network resources that would otherwise be used in providing the user device with undesired content.

An aspect of the present disclosure relates to the utilization of heuristics and learning engines to generate customized previews for a given user or set of users. Such customized previews may greatly increase the speed and accuracy with respect to a user determining whether or not to view a program, thereby reducing the amount of backend server resources needed to fulfill the content discovery function.

It is understood that the various aspects disclosed herein may be utilized together (e.g., via common system(s)) or separately.

Optionally, processes disclosed herein may be performed by one or more backend server systems, a user device hosting a connected television streaming application or the like, and/or partially by the backend system(s) and partially by a streaming application hosted on a user device.

As discussed herein, streaming media has become a central mechanism for delivering video content to users, with millions of items of streaming content (e.g., standalone movies, episodes of television series, etc.) available. Conventionally, it can be exceedingly difficult to navigate among the titles to find content of interest, often requiring a user to scroll through screen after screen of libraries of video programs, select a video program that appears to be of interest, play the selected video program, only to discover that the video program is not interesting to the user, and so the discovery process needs to be repeated again and again. Not only is this conventional content discovery process frustrating to the user, this process consumes an inordinate amount of backend server resources (e.g., processor, memory, and network interface resources), as well as network bandwidth, in streaming what is unwanted video content to user devices. Further, this process requires large amounts of time-consuming navigation and scrolling by the user to view page after page of video content listings.

Conventional approaches to expediting the discovery process may involve streaming standardized previews. However, the same preview is generally presented to all viewers, regardless of their interests, thereby being of limited utility in determining whether or not to select and stream the content item being previewed.

As will be discussed herein, a navigation interface and functionality are provided that enable a user to swiftly navigate from a given genre to a more specific genre and from a given subgenre to a broader genre/subgenre. Further, a customized preview generation process is described, where scenes that are determined to be more likely of interest to a given user or set of users are selected and used to generate a customized preview for the given user or set of users. Optionally, a set of different previews may be created for a given content item with different sets of scenes corresponding to different subject matters. For example, one preview for the content item may focus on romance scenes, while another preview for the content item may focus on action scenes. A given preview may then be selected to be played back to a given user using the user's preferences and/or other factors.

Certain example aspects will now be discussed with reference to the figures. FIG. 1 illustrates an example environment. A content composer and content transmission system 104 (which may include a stitcher component, such as a server, providing stitcher services or where a stitcher system may include a content composer component, or where the content composer and the stitcher may be independent systems) is connected to a network 102 (e.g., a wide area network, the Internet, a local area network, or other network). The content composer and content transmission system 104 is configured to communicate with client devices $\mathbf{106}_1 \ldots \mathbf{106}_n$ (e.g., connected televisions, smart phones, laptops, desktops, game consoles, streaming devices that connect to televisions or computers, etc.) that comprise video players. By way of example, the video player may be embedded in a webpage, may be a dedicated video player application, may be part of a larger app (e.g., a game application, a word processing application, etc.), may be hosted by a connected television (CTV), or the like. The system 104 may be configured to provide video-on-demand (VOD) streaming content, linear, time-scheduled streaming video content, and/or downloadable video content.

For example, the content composer and content transmission system 104 may receive a request for media from a given client device 106 in the form of a request for a playlist manifest or updates to a playlist manifest. The content composer and content transmission system 104 may optionally determine if interstitial content is to be inserted in an item of primary content (e.g., a movie, a television show, a sporting event, etc.). If interstitial content is to be inserted in an item of primary content, a file may be accessed indicating the location and length of an interstitial pod (a time frame reserved for interstitials, wherein one or more interstitials may be needed to fill a pod), the system 104 may determine context information (e.g., information regarding the primary content being requested, information regarding the user, and/or other context information), solicit and select interstitial content from third parties, define customized interstitials as described herein, generate playlist manifests, and/or perform other functions described herein.

The content composer and content transmission system 104 and/or another system may stream requested content to the requesting client device 106. The content composer and content transmission system 104 may stream content to a client device 106 in response to a request from the client device 106 made using a playlist manifest entry, or the content composer and content transmission system 104 may stream content to a client device 106 in a push manner (in the absence of a client device request). Thus, the assembly of video clips into a program or other integrated item of content may be performed on the client side by assembling a set of separate video clips accessed via a manifest. Optionally, the assembly of video clips into a program or other integrated item of content may be performed on the server-side, which may pre-stitch a plurality of clips into a single item of content, and then push the single item of content to a user device via a single video stream URL.

Optionally, the content composer and content transmission system 104 may transmit context information to one or more interstitial source systems $\mathbf{108}_1 \ldots \mathbf{108}_n$. For example, the source systems $\mathbf{108}_1 \ldots \mathbf{108}_n$ may optionally include ad servers, and the interstitial content may comprise ads. The interstitial source systems $\mathbf{108}_1 \ldots \mathbf{108}_n$ may comply with the VAST protocol. By way of further example, the interstitial source systems $\mathbf{108}_1 \ldots \mathbf{108}_n$ may provide public service videos, previews of upcoming programs, quizzes, news, games, and/or other content. The interstitial source systems $\mathbf{108}_1 \ldots \mathbf{108}_n$ may use the context information in determining what interstitial content (if any) is to be provided or offered to the requesting client device 106.

The content composer and content transmission system 104 may provide video content on a video-on-demand (VOD) basis to client devices 106. For example, as will be described herein, the content composer and content transmission system 104 may provide and/or populate user interfaces (e.g., see FIGS. 3A, 3B) presenting representations of a library of content items via a user device 106, where the user may select a given content item and the selected content item will be substantially immediately streamed to the user device as video-on-demand content.

The content composer and content transmission system 104 may, in addition, provide linear scheduled video content via one or more channels (e.g., themed channels) according to a program schedule, where a given program may have a scheduled start time and end time. For example, a user interface of a program guide may be presented on a user device 106, the program guide listing channels and the start and end times of programs of a given channel over a period of time (e.g., the current time and for a period of 2 or 3 hours thereafter, where the user may be enabled to scroll further forward through the program guide). The user may select a channel (or a program associated with a channel) via the program guide, and the currently scheduled program for that channel will be streamed to the user device at its current scheduled playback position.

As described herein, the content composer and content transmission system 104 may select a set of content items to be rendered on the user device 106 in response to navigation inputs from the user. For example, in response to activation of a drill-up control (e.g., which may be an upwardly pointing symbol, such as an upwardly pointing arrow, chevron, finger, or the like) while a set of content items for a given genre or subgenre is displayed, a broader genre may be selected, and corresponding representations of content items may be provided for display on the user device 106. By way of further example, in response to activation of a drill-down control (e.g., which may be a downwardly pointing graphic, such as an upwardly pointing arrow, chevron, finger, or the like) while a set of content items for a given genre or subgenre is displayed, a narrower genre may be selected, and corresponding representations of content items may be provided for display on the user device 106. The foregoing navigation controls will be further described with reference to FIGS. 3A and 3B.

In addition, as described herein, the content composer and content transmission system 104 may be configured to generate customized previews for a content item based at least in part on a user's subject matter preferences (e.g., express and/or inferred preferences, examples of which are described herein). The composer and content transmission system 104 may optionally stream or download one or more previews to the user device 106. The preview may optionally be displayed in full screen mode on the user device 106, automatically and/or in response to a user command. Once a given preview is displayed, and a preview for another content item may optionally be immediately automatically initiated and displayed on the user device 106 or automatically initiated and displayed on the user device 106 after a specified period of time, where other content (e.g., the user interface displaying representations of selectable content items) may be displayed via the user device 106 between previews.

Figure 2A:
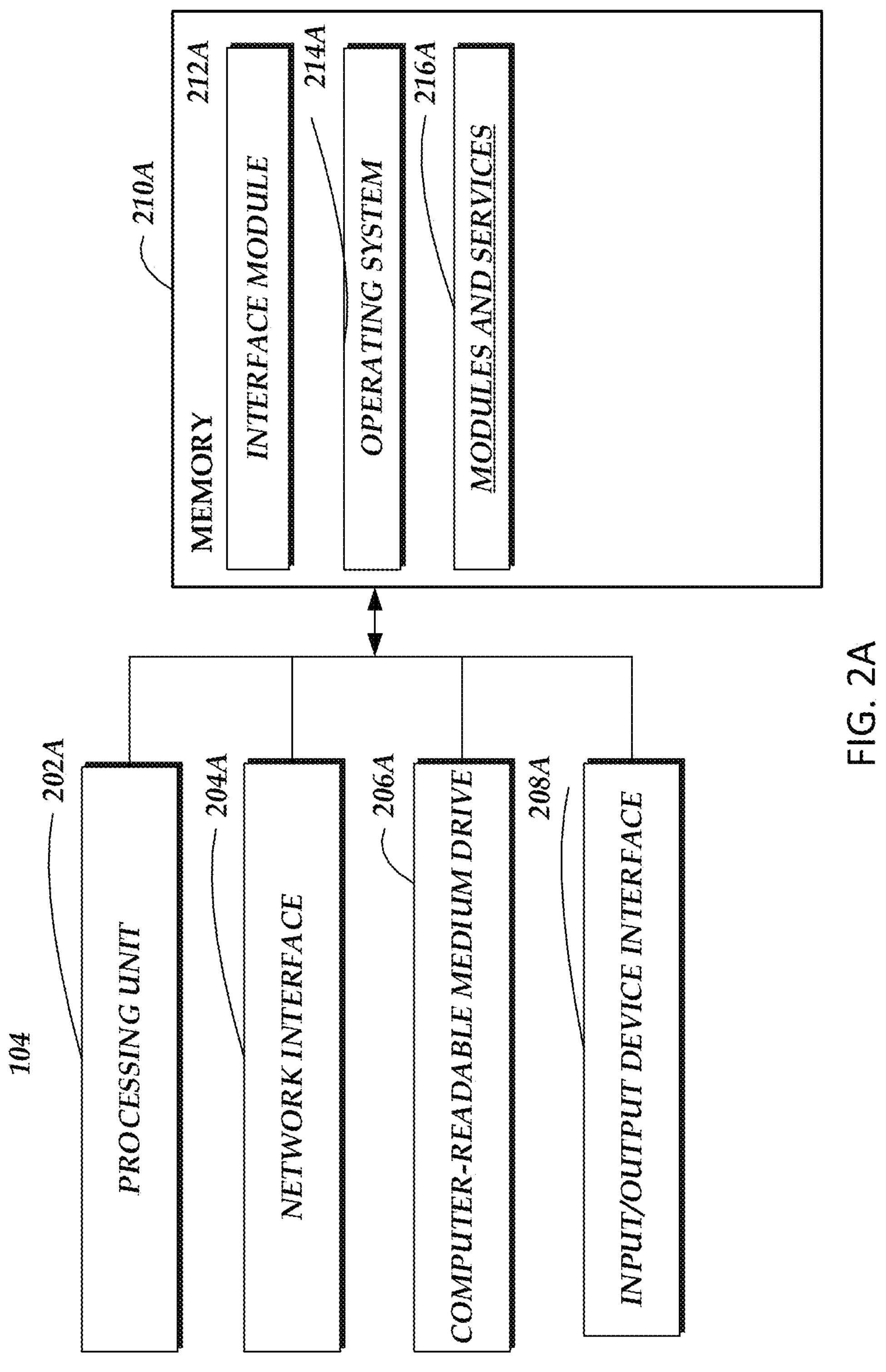
FIG. 2A is a block diagram illustrating example components of a content composer and streaming system.

FIG. 2A is a block diagram illustrating example components of a content composer and content transmission system 104. The example content composer and content transmission system 104 includes an arrangement of computer hardware and software components that may be used to implement aspects of the present disclosure. Those skilled in the art will appreciate that the example components may include more (or fewer) components than those depicted in FIG. 2A. The composer and content transmission system 104 may optionally be a cloud-based system including a hosted computing environment that includes a collection of physical computing resources that may be remotely accessible and may be rapidly provisioned as needed. Further, the composer and content transmission system 104 may include or utilize a hosted storage environment that includes a collection of physical data storage devices that may be remotely accessible and may be rapidly provisioned as needed (sometimes referred to as "cloud" storage). Such cloud storage may be utilized to store some, or all of the data, programs, and content described herein.

The content composer and content transmission system 104 may include one or more processing units 202A (e.g., a general purpose processor, an encryption processor, a video transcoder, and/or a high speed graphics processor), one or more network interfaces 204A, a non-transitory computer-readable medium drive 206A, and an input/output device interface 208A, all of which may communicate with one another by way of one or more communication buses. The network interface 204A may provide the various services described herein with connectivity to one or more networks (e.g., the Internet, local area networks, wide area networks, personal area networks, etc.) and/or computing systems (e.g., interstitial source systems, client devices, etc.). The processing unit 202A may thus receive information, content, and instructions from other computing devices, systems, or services via a network, and may provide information, content (e.g., streaming video content, content item previews, etc.), and instructions to other computing devices, systems, or services via a network. The processing unit 202A may also communicate to and from non-transitory computer-readable medium drive 206A and memory 210A and further provide output information via the input/output device interface 208A. The input/output device interface 208A may also accept input from various input devices, such as a keyboard, mouse, digital pen, touch screen, microphone, camera, etc.

The memory 210A may contain computer program instructions that the processing unit 202A may execute in order to implement one or more aspects of the present disclosure. The memory 210A generally includes RAM, ROM and/or other persistent or non-transitory computer-readable storage media. The memory 210A may include cloud storage. The memory 210A may store an operating system 214A that provides computer program instructions for use by the processing unit 202A in the general administration and operation of the modules and services 216A, including its components. The modules and services 216A are further discussed with respect to FIG. 2B and elsewhere herein. The memory 210A may further include other information for implementing aspects of the present disclosure.

The memory 210A may include an interface module 212A. The interface module 212A can be configured to facilitate generating one or more interfaces through which a compatible computing device may send to, or receive from, the modules and services 216A.

Figure 2B:
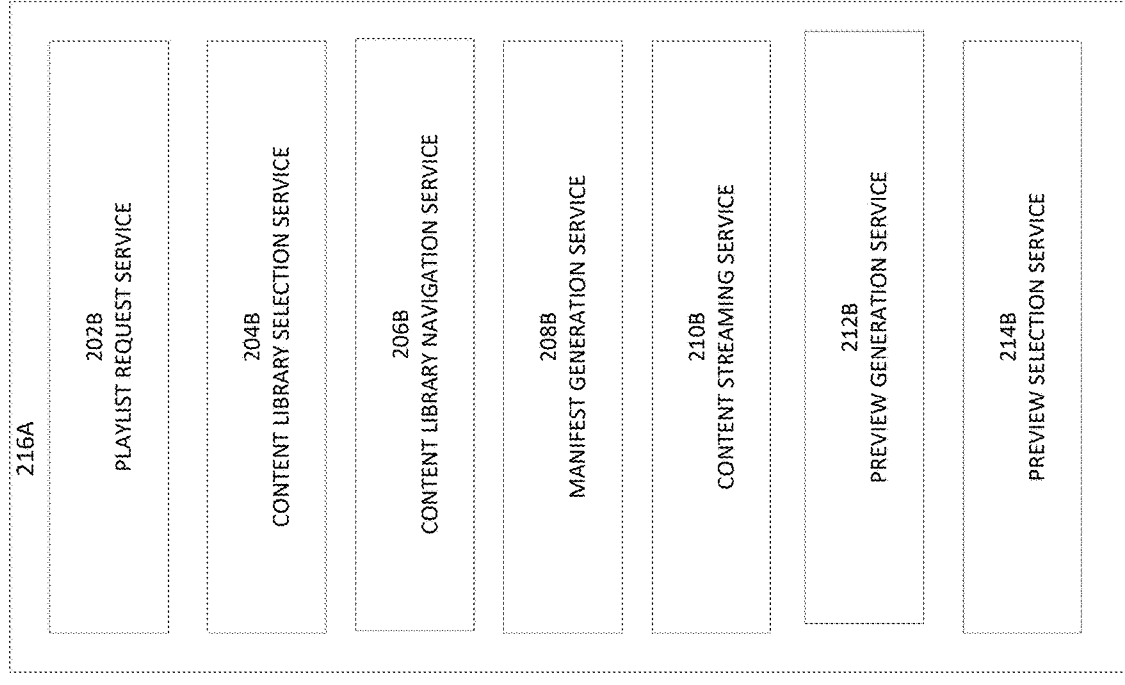
FIG. 2B illustrates example modules and services of the content composer and streaming system.

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, the processing unit 202A may optionally include a general purpose processor and may optionally include a video codec. The system 104 may offload certain compute-intensive portions of the modules and services 216A (e.g., transcoding and/or transrating a stream for adaptive bitrate operations, compositing, and/or the like) to one or more dedicated devices, such as a video codec (e.g., H.264 encoders and decoders), while other code may run on a general purpose processor. The system 104 may optionally be configured to support multiple streaming protocols, may provide low latency pass-through, and may support a large number of parallel streams (e.g., HD, 4K, and/or 8K streams). The processing unit 202A may include hundreds or thousands of core processors configured to process tasks in parallel. A GPU may include high speed memory dedicated for graphics processing tasks. As another example, the system 104 and its components can be implemented by network servers, application servers, database servers, combinations of the same, and/or the like, configured to facilitate data transmission to and from data stores, user terminals, and third party systems via one or more networks. Accordingly, the depictions of the modules are illustrative in nature.

The modules and services 216A may include modules that provide a playlist request service, a content library selection service 204B, a content library navigation service 206B, a playlist manifest generation service 208B, a content streaming service 210B, a preview generation service 212B, and a preview selection service 214B.

The playlist request service 202B may receive and process requests for playlist manifests. Optionally, the content library selection service 204B may select items of content from a library to be presented via a user interface on a user device 106. As similarly discussed elsewhere herein, such items may be selected based on user express and/or inferred preferences, user navigation inputs, in response to user content search queries, and/or otherwise.

The content library navigation service 206B may receive and process user content library navigation commands, such as drill-up, drill-down, scroll left, scroll right, go back to the previews user interface, go to home screen, play, add to watchlist, and/or other navigation commands provided via corresponding user interface controls. The content library navigation service 206B may communicate with the content library selection service 204B (e.g., communicate user navigation commands), enabling the content library selection service 204B to accordingly populate a library navigation user interface (e.g., such as that illustrated in FIGS. 3A and 3B) with corresponding representations of content items.

The manifest generation service 208B may be used to assemble a playlist manifest (e.g., an HLS or MPEG DASH manifest) including locators (e.g., URLs) pointing to segments and sections of primary and interstitial content and locators (e.g., URLs), organized to correspond to the desired playback sequence. The manifest may be transmitted to a client (e.g., a streaming application) on a user device 106. The client may then request a given item of content (e.g., section or segment) as needed, which may then be served (e.g., streamed) by the corresponding content source or intermediary to the client.

The content streaming service 210B may stream content (e.g., video content, such as video programs and video program previews) to clients (e.g., connected TV streaming applications) hosted on content reproduction user devices 106 or other destination.

Preview generation service 212B is configured to generate content item previews customized for a specific user or for a set of users with certain common characteristics (e.g., certain common preferences, such as one or more common genre/subgenre preferences). As discussed elsewhere herein, a customized model comprising a learning engine may be generated for a specific user or set of users. The customized model may be configured to select scenes of a specific length or of varying lengths (optionally with a maximum, not-to-exceed length) from a content item to be included in a video preview based on the user's preferences (express and/or inferred preferences) and the subject matter of various scenes in the content item (e.g., as determined for subject matter metadata associated with various scene start points and end points).

Optionally, a preview selection service 214B may be provided that is configured to select for a given user, among a set of existing previews for a given content item, a preview that is most suitable for the user (e.g., as determined by comparing metadata describing the preview scene content with the user's preferences). For example, the set of previews may be created for a given content item, where different previews have different sets of scenes (e.g., corresponding to different subject matters). For example, one preview for the content item may focus on romance scenes, while another preview for the content item may focus on action scenes.

Figure 2C:
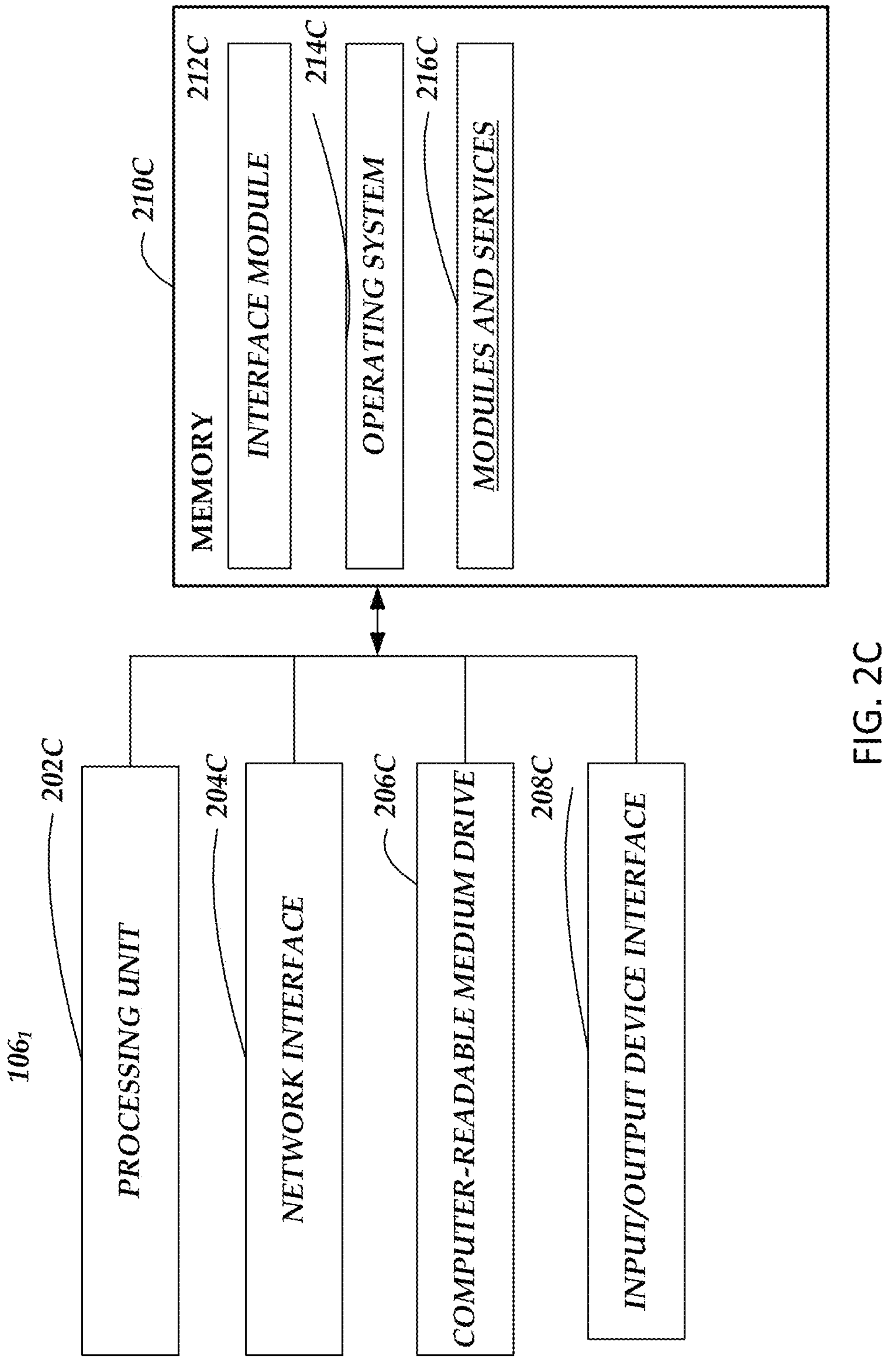
FIG. 2C is a block diagram illustrating example components of a content reproduction system.

FIG. 2C is a block diagram illustrating example components of a user device/connected TV (CTV) 106$_1$. The example CTV 106 includes an arrangement of computer hardware and software components that may be used to implement aspects of the present disclosure. Those skilled in the art will appreciate that the example components may include more (or fewer) components than those depicted in FIG. 2C.

The CTV 106 may include one or more processing units 202C (e.g., a general purpose processor, an encryption processor, a video transcoder, and/or a high speed graphics processor), one or more network interfaces 204C, a non-transitory computer-readable medium drive 206C, and an input/output device interface 208C, all of which may communicate with one another by way of one or more communication buses. The network interface 204C may provide the various services described herein with connectivity to one or more networks or computing systems, such as the content composer and content transmission system 104, the source systems 108$_1$ . . . 108$_n$, and/or other content streaming systems. The processing unit 202C may thus receive information, content, and instructions from other computing devices, systems, or services via a network and may transmit information, content, and instructions to other computing devices, systems, or services via a network. The processing unit 202C may also communicate to and from non-transitory computer-readable medium drive 206C and memory 210C and further provide output information via the input/output device interface 208C. The input/output device interface 208C may also accept input from various input devices (which may be integral to the CTV 106 or remote from the CTV 106), such as a keyboard, buttons, knobs, sliders, remote control, mouse, digital pen, touch screen, microphone (e.g., to receive voice commands), cameras, light intensity sensors, etc.

The memory 210C may contain computer program instructions that the processing unit 202C may execute in order to implement one or more aspects of the present disclosure. The memory 210C generally includes RAM, ROM and/or other persistent or non-transitory computer-readable storage media. The memory 210C may store an operating system 214C that provides computer program instructions for use by the processing unit 202C in the general administration and operation of the modules and services 216C, including its components. The memory 210C may comprise local memory and cloud storage. The modules and services 216C are further discussed with respect to FIG. 2D and elsewhere herein. The memory 210C may further include other information for implementing aspects of the present disclosure.

The memory 210C may include an interface module 212C. The interface module 212C can be configured to facilitate generating and/or populating one or more interfaces through which a compatible computing device may send to, or receive from, the modules and services 216C.

Figure 2D:
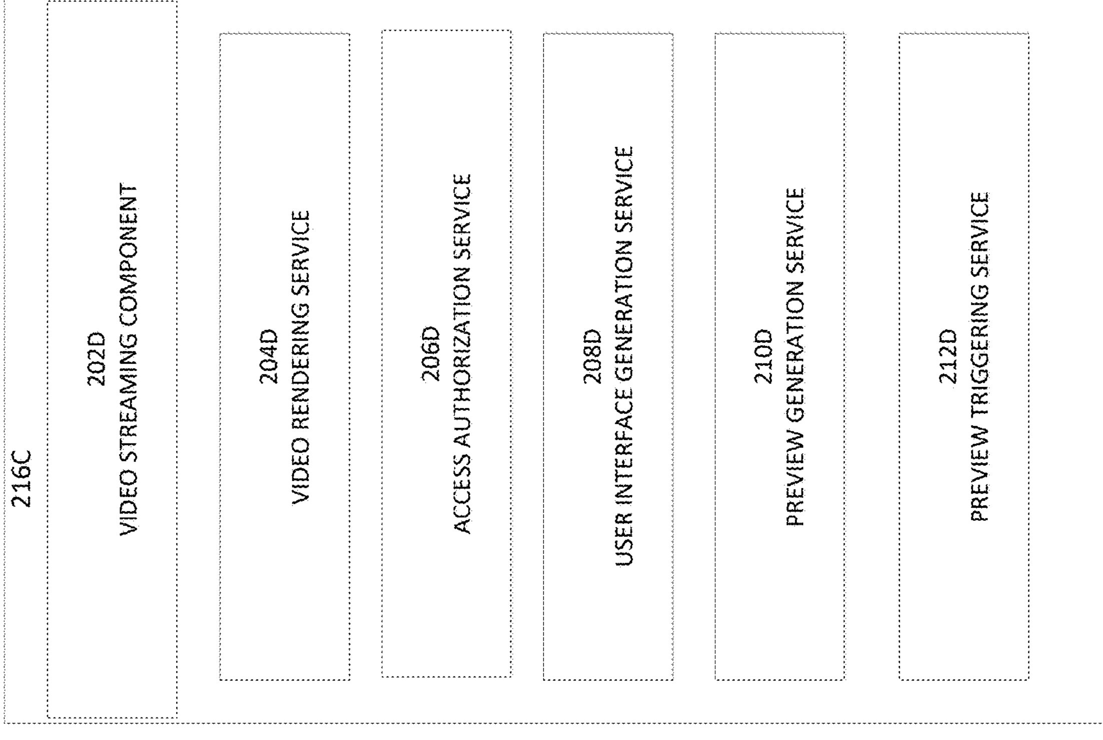
FIG. 2D illustrates example modules and services of the content reproduction system.

With reference to FIG. 2D, the modules and services 216C may include a video streaming component/application ("app") 202D configured to receive streaming media (e.g., video content, such as video programs and video previews from content composer and content transmission system 104, the source systems 108$_1$ . . . 108$_n$, and/or other content streaming systems), further comprising a video rendering component 204D, an access authorization component 206D, a user interface generation component 208D (which may be utilized to generate and/or populate user interfaces described herein, such as content library navigation interface), a preview generation service 210D (configured to generate video previews of content items), and a preview triggering service 212D configured to launch a video preview (e.g., in full screen mode) based on triggers, such as specified events and/or rules. For example, the preview triggering service 212D may be configured to launch and playback on the user device 106 a selected preview of an item of video content (whose representation is displayed in a navigable content library user interface), then optionally display the navigable content library user interface a specified amount of time, and then, in the absence of a user action, automatically launch a next video preview, where the next preview may be selected based on one or more rules (e.g., relative location on the content library user interface with reference to the content item that was just previewed, a prediction on how much the user would like a given video, etc.).

The modules or components described above may also include additional modules or may be implemented by computing devices that may not be depicted in FIGS. 2C and 2D. For example, although the interface module 212C and the modules and services 216C are identified in FIG. 2B as single modules, the modules may be implemented by two or more modules and in a distributed manner. By way of further example, the processing unit 202C may optionally include a general purpose processor and may optionally include a video codec. The CTV 106 may offload certain compute-intensive portions of the modules and services 216C to one or more dedicated devices, such as a video codec (e.g., H.264 encoders and decoders), while other code may run on a general purpose processor. The system 104 may optionally be configured to support multiple streaming protocols, may provide low latency pass-through, and may support a large number of parallel streams (e.g., HD, 4K, and/or 8K streams). The processing unit 202C may include hundreds or thousands of core processors configured to process tasks in parallel. A GPU may include high speed memory dedicated for graphics processing tasks.

As discussed above, the manifest generation service 208B may generate and provide playlist manifests. For example, a request for a playlist manifest (e.g., an HLS .m3u8 or an MPEG DASH .mpd manifest file) may be transmitted (e.g., by a stitcher system) over a network (e.g., a wired or wireless network) by the video streaming component/application 202D on a user device 106 which may enable the content to be played via a video player. The request may be for an item of primary content, such as a prerecorded movie, prerecorded program, or live sporting event or other content item. The request or other communication may identify user device characteristics such as device manufacturer, device model, display size (e.g., display height and width in pixels), device height/width ratio, device operating system, and/or other information.

The request for an item of content (and hence the playlist manifest) may have been triggered by the user manually clicking on a play control of the user device 106 or the request may have been automatically issued by an application. For example, if the user has completed playing a first movie (or other content), an application (e.g., such as that described in U.S. Pat. No. 9,258,589, titled "METHODS AND SYSTEMS FOR GENERATING AND PROVIDING PROGRAM GUIDES AND CONTENT," issued Feb. 9, 2016, and/or U.S. application Ser. No. 15/635,764, titled "METHODS AND SYSTEMS FOR GENERATING AND PROVIDING PROGRAM GUIDES AND CONTENT," filed Jun. 28, 2017, the contents of which are incorporated by reference in their entirety) may automatically request a manifest for another item of primary content. For example, if the user is watching video-on-demand content, the request may be for a manifest of an item of video content of the same genre as the one that as just played back. If the item of video content that was just shown is a time-scheduled item of video content (e.g., in accordance with a program guide), requested playlist manifest may be for the next scheduled item of primary content.

In particular, if the video content that was just shown is a time-scheduled item of video content, the next scheduled primary content item may be scheduled in accordance with a program guide, where the program guide may include multiple channels (e.g., corresponding to different subject matters), where a given channel has associated programs (e.g., movies, programs, live sporting events, or other items of content) with scheduled start and end times. Thus, for example, a manifest for an item of primary content may be automatically requested based at least in part on a comparison of the current time and the scheduled starting time for the item of content. If the difference between the current time and the scheduled starting time satisfies a threshold (which could be 0 seconds, or some larger number (e.g., 0.5, 1, or 2 seconds) to enable buffering of the program prior to the start time) the corresponding playlist manifest may be automatically requested and provided to the video player.

The playlist manifest request may be received by the content composer and content transmission system 104. The content composer and content transmission system 104 may identify the location and length of interstitial pods within the requested primary content. For example, the content composer and content transmission system 104 may access a file or other metadata associated with the primary content that indicates the positions within the primary content for interstitial pods, wherein a given interstitial pod may have a specified length (e.g., 15 seconds, 30 seconds, 1 minute, 2 minutes, or other length). The interstitial pod may optionally include an indication that a customized interstitial is to be played. The sections for the customized interstitial may be selected from alternative sections. In addition, if there is not enough information to select a section for a given insertion point based on selection criteria, a default section may be selected. In addition, a given section of the customized interstitial may optionally be common for all customized versions of the interstitial content.

As discussed above, the manifest generation service 208B may generate the playlist manifest (e.g., an HLS .m3u8 or an MPEG DASH .mpd manifest file). The manifest file may include locators (URLs) for each primary content segment, and each interstitial segment and/or section if any (where optionally an interstitial section is equal to a segment length or an integer multiple thereof) in the desired playback order. The manifest file may include the entire playlist for the requested content or only a portion thereof.

The content composer and content transmission system 104 may transmit the manifest file to the video streaming component/application 202D on the user device 106 which may enable the content to be played via a video player video player. The client player may request content, including interstitial content segments/sections (if any), in accordance with the playlist manifest. The content composer and content transmission system 104 receives the content requests, including requests for interstitial content segments/sections from the client in sequential order. The content composer and content transmission system 104 may stream the content, or cause the content to be streamed from a different source, to the video play hosted by the user device 106.

Although in the foregoing example, the identification and selection of sections for a content item (e.g., primary content, a preview, etc.), as well as the generation of a manifest, are performed at least partly in response to a request from a client on a user device, optionally these operations may be performed independent of and prior to such a client request. For example, the manifest generation may be performed independently of and prior to (and in anticipation of) a client request, and such generated manifest may be stored in memory for later use in enabling the client to access such customized content item. Further, the customized preview of a content item may be transmitted to the user device immediately before, with, or during the display of the navigable content library user interface.

As discussed herein, a navigable content library user interface may provide user content library navigation commands, such as drill-up, drill-down, scroll left, scroll right, go back to previous user interface, go to home screen, play, add to watchlist, and/or other navigation commands provided via corresponding user interface controls. Example content library user interfaces will be described with reference to FIGS. 3A and 3B Referring to FIG. 3A, an example content library navigation user interface 302 that may be presented on a user device is illustrated. The user interface 302 depicts representations of a set of a plurality of content items 312 (e.g., on-demand video programs) available to stream to the user device. The representations of the content items 312 may comprise a thumbnail of a frame from the content item 312, artwork representing the content item 312, text (e.g., a title) identifying the content item 312, still images of actors or sets used in the content item 312, and/or other representations of the content item 312. Optionally, in addition to or instead of displaying video-on-demand content items, the set of content items 312 may include content items currently playing/streaming and/or that are scheduled to play/stream in the future in accordance with a video program guide having scheduled video program start and end times (e.g., as part of channels of scheduled video content, where the channels may be associated with respective themes/genres).

The displayed content items 312 may comprise the same content items that are displayed to all viewers at a given point in time and in a given governmental or other area (as the rights to stream various items of content may vary from country to country). Alternatively, the displayed content items 312 may comprise the same content items that are displayed to all viewers at a given point in time and in a given governmental or other area for a given genre or subgenre (where a subgenre is one of several categories within a particular genre), where the genre or subgenre (e.g., comedy, rom-com, action, action-revenge, science fiction and fantasy, science fiction, fantasy, mystery, film noir, etc.) is automatically selected or is manually selected by the viewer.

By way of further example, the displayed content items 312 may comprise content items that are recommend to the viewer (or a set of viewers) based on one or more viewer/user characteristics (e.g., preferences and/or demographics which may be accessed from a user record associated with the viewer). The displayed content items 312 may include programs (e.g., movies and/or television series comprising multiple episodes) that the user has begun but has not completed watching. The content items may be displayed in a grid (as illustrated), a list, a carousel, or otherwise.

With respect to selecting content items to populate the user interface 302, the viewer may be identified via a user selection of a viewer profile from a profile user interface, via login credentials, and/or otherwise. The viewer's characteristics may be accessed from memory and may include preferences expressly provided by a user and/or preferences inferred from user behavior. By way of example, a user may have provided express preferences via profile user interface or other user interface indicated preferred and/or disfavored genres, subgenres, classifications (e.g., for mature audiences only, family friendly, violence, obscene language, sexual situations, smoking, drug use, alcohol use, etc.), actors, directors, screenwriters, languages, time lengths, sports teams, sporting events, musical performers, time of release (e.g., decade in which a content item was released), etc. Other factors may be utilized in addition or instead in selecting content items for the user interface 302, such as date, time of day, geographical location, and the like.

The user's preferences may be inferred from observing and recording what content (e.g., genres, subgenres, time of release, actors, directors, languages, lengths, classifications, etc.) the user has historically watched (optionally weighting more recent viewing habits over older viewing habits, and/or optionally limited to a specific period of time, such as the last 12 months), the amount of time the user has watched respective genres/subgenres (optionally weighting more recent viewing habits over older viewing habits, and/or optionally limited to a specific period of time, such as the last 12 months), the frequency in which the user has watched respective genres/subgenres (optionally weighting more recent viewing habits over older viewing habits, and/or optionally limited to a specific period of time, such as the last 12 months), content the user has added to a watchlist (e.g., a user accessible list of content items for future viewing, optionally limited to the pending unwatched content on the watchlist, optionally weighting more recent additions to the watchlist over older additions to the watchlist, and/or optionally limited to content added to the watchlist over a specific period of time, such as the last 12 months), a user's favorite/selected channels with respect to channels presented via a program guide (e.g., such as that described herein), scenes that the user rewound and rewatched (e.g., action scenes, funny moments, explosions, horror scenes, car chase scenes, beach scenes, romantic scenes, etc.), a user selection of a content item to watch immediately after viewing a preview of the content item, a user selection of a content item to watch a threshold period of time (e.g., more than 1 hour, more than 1 day, more than 1 week, more than 1 month, or other time period) after viewing a preview of the content item, content items the user did not watch after viewing a preview of the content items, and/or the like.

The determination of the inferred user preferences may be updated periodically (e.g., hourly, daily, weekly, monthly, or other time period) and/or in response to certain events (e.g., the viewing of a content item by a user, the viewing of a preview by the user, the viewing of a content item immediately after viewing a preview of the content item, the viewing of a content item within a threshold period of time (e.g., a specified number of hours, days, or weeks) after viewing a preview of the content item, the addition of a previewed or non-previewed content item to a watchlist by the user, a recording of a content item, other actions described herein from which user preferences are determined, the user launching and/or accessing the streaming application on the user device, and/or the like).

The navigation controls may include a drill-up control 304 (e.g., which may be an upwardly pointing graphic, such as an upwardly pointing arrow, chevron, finger, or the like), a drill-down control 306 (e.g., which may be an downwardly pointing graphic, such as an upwardly pointing arrow, chevron, finger, or the like), a scroll left control 308, and a scroll right control 310. In addition, a play control, a full screen control, an add to playlist control, and text that provides information regarding one or more content items may be displayed. A genre and/or subgenre description/title may be provided, where a subgenre may be a smaller and more specific genre within a broader genre, and where a given subgenre may comprise sub-subgenres. Some or all of the foregoing may be displayed overlaying the grid of content items 312 and may optionally be translucent or solid. Some or all of the foregoing may be displayed to one side of the grid of content items 312 and may optionally be translucent or solid. Optionally, some or all of the foregoing may be automatically removed from the user interface after a specific period of time or in response to a user action. For example, optionally, the drill-up control 304, the drill-down control 306, the scroll left control 308, and the scroll right control 310 may cease to be displayed after a specified period of time and/or in response to a user input via the user interface, while optionally the full screen control, the add to playlist control, and the text that provides information regarding one or more content items may (or may not) continue to be displayed. Optionally, the drill-up control 304, the drill-down control 306, the scroll left control 308, and/or the scroll right control 310 are not displayed on the user content reproduction device (e.g., connected TV) display but are provided via a remote control device (e.g., via physical buttons or touch controls presented via a touch screen of a remote control device).

Activation of the drill-up control 304 (e.g., by clicking on, hovering over, providing a voice instruction, or otherwise selecting the drill-up control 304) may cause a broader genre of content to be selected (e.g., by the system 104 or by the modules and services 216C) and/or displayed. For example, if the current genre is rom-com (romantic comedy), activation of the drill-up control 304 may cause content items in the broader genre category of "comedy" to be selected and displayed. If the user activates the drill-down control 306, one or more subgenres of the currently displayed genre may be selected and displayed. For example, if the current genre is rom-com, the subgenres may be "relationship", "screwball", and/or "farce". The subgenre(s) may be automatically selected based on one or more of the user's express and/or inferred preferences, such as those described elsewhere herein. Optionally, activation of the drill-down control 306 will cause a listing of such subgenres to be displayed, where the user can select one or more the subgenres, and the selected representations of content items of the selected subgenres will be provided for display.

Activation of the scroll left control 308 or the scroll right control 310 may cause the displayed content items to respectively cause the displayed content items to be scrolled left or right so that certain content items that were offscreen will now be displayed.

Figure 3A:
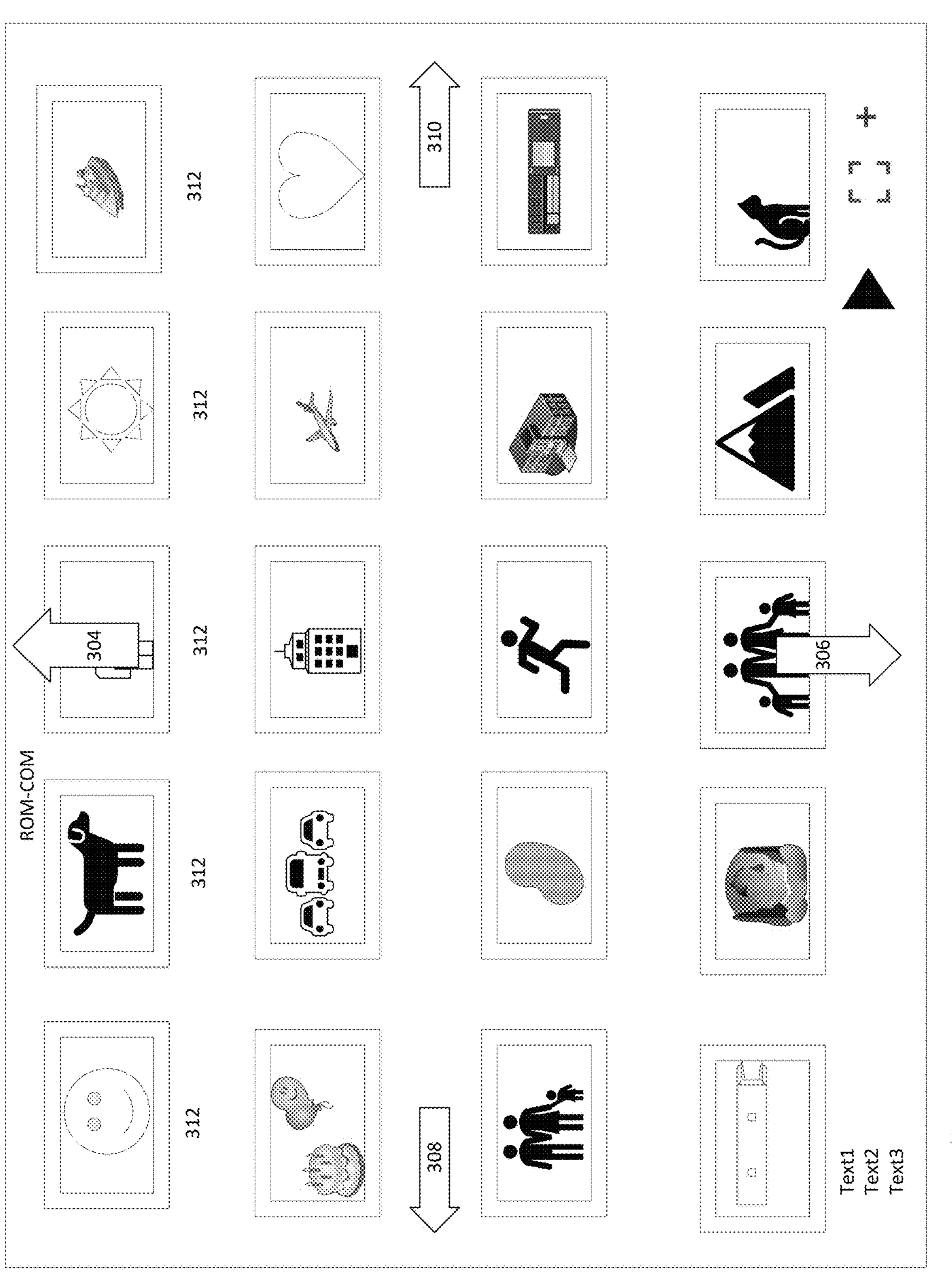
FIGS. 3A-3C illustrate user interfaces.
Figure 3B:
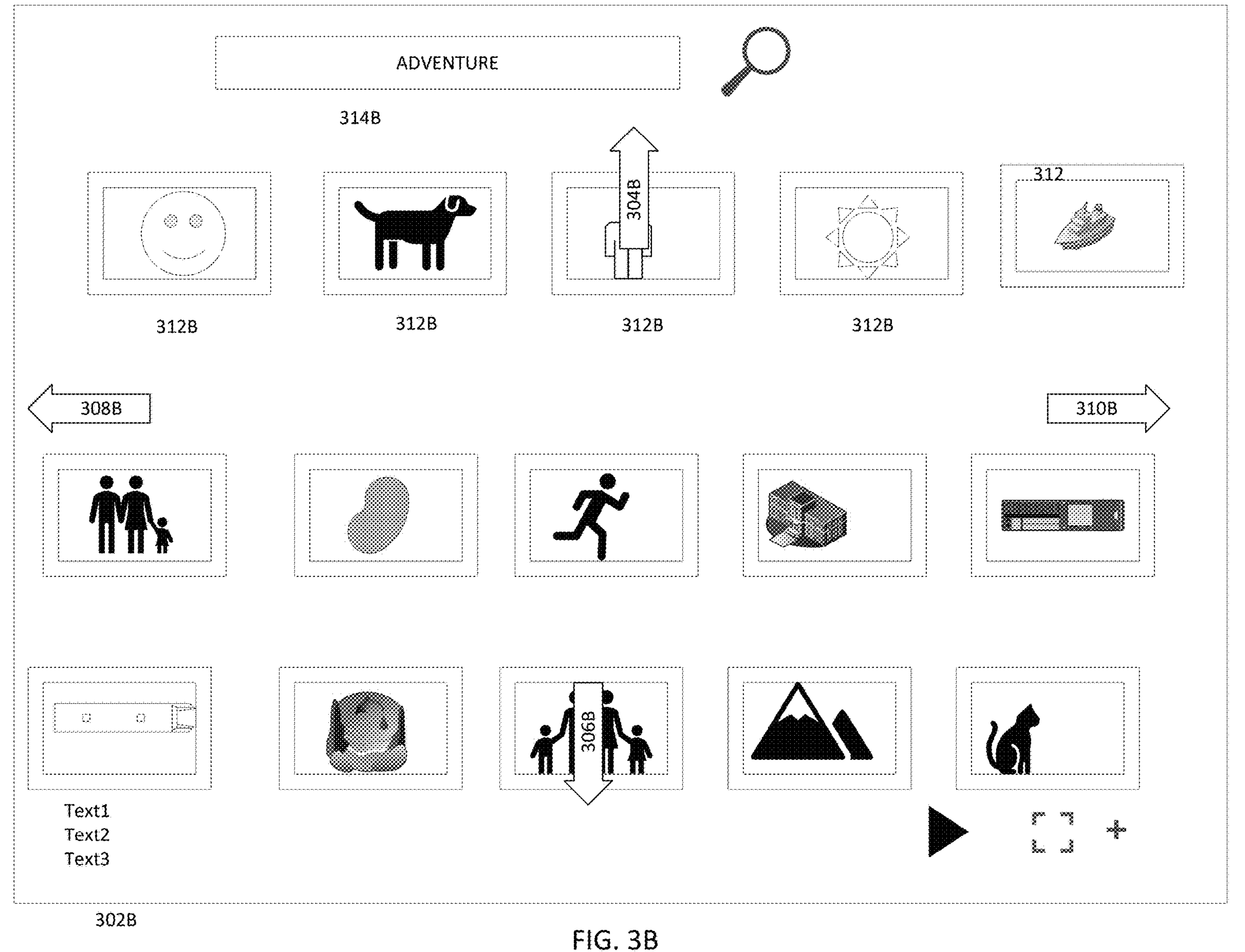

By way of yet further example with reference to FIG. 3B, a user interface 302B, including the displayed content items 312B, may comprise search results displayed in response to a user text search query for matching content items, entered via search field 314B or via a voice search query. For example, a user search query may comprise a genre, subgenre, a title (or portion thereof), languages, time lengths, sports teams, sporting events, the name(s) of actors, directors, screenwriters, musical performers, etc. A search engine (which may be hosted by system 104 or other system) may identify content that matches the search query (e.g., by comparing the search terms or synonyms thereof to metadata associated with the content items). The content items may be arranged based on the relative closeness of the match. For example, the closest match may be displayed in the top left corner of the content item grid, the next closest match may be displayed immediately to the right of the closet match, and so on.

As similarly discussed above with respect to FIG. 3A, intuitive navigation controls may be provided that enable a user to locate content items of interest with less navigation though screens needed and more quickly than with conventional navigation controls. Further, because the navigation controls enable a user to more quickly identify content items of interest, the amount of streaming computer resources (e.g., server processor, memory, and network resources, and user device processor, memory, and network resources) will be utilized streaming previews of content items or the content items themselves that the user may not be interested in.

The navigation controls may include a drill-up control 304B, a drill-down control 306B, a scroll left control 308B, and a scroll right control 310B. In addition, a play control, a full screen control, an add to playlist control, and text that provides information regarding one or more content items may be displayed. The search query terms may also be displayed. Optionally, if the search query terms comprise a subgenre, the subgenre title may be displayed in association with the titles of associate higher and lower level genres, where the user may select one of the higher or lower level genres, and corresponding content items may be displayed.

As similarly discussed above with respect to FIG. 3A, some or all of the foregoing may be displayed overlaying the grid of content items 312B and may optionally be translucent or solid. Some or all of the foregoing may be displayed to one side of the grid of content items 312B and may optionally be translucent or solid. Optionally, some or all of the foregoing may be automatically removed from the user interface after a specific period of time or in response to a user action. For example, optionally, the drill-up control 304B, the drill-down control 306B, the scroll left control 308B and the scroll right control 310B may cease to be displayed after a specified period of time and/or in response to a user input via the user interface, while optionally the full screen control, the add to playlist control, and the text that provides information regarding one or more content items may (or may not) continue to be displayed.

Where the user search query comprises a genre/subgenre, activation of the drill-up control 304B (e.g., by clicking on, hovering over, or other selecting the drill-up control 304B) may cause a broader genre of content to be selected and/or displayed. For example, if the current, searched-for genre is rom-com (romantic comedy), activation of the drill-up control 304B may cause content items in the broader genre category of "comedy" to be selected and displayed. If the user activates the drill-down control 306B, one or more subgenres of the currently displayed genre may be selected and displayed. For example, if the current genre is rom-com, the subgenres may be "relationship", "screwball", and/or "farce". The subgenre(s) may be automatically selected based on one or more of the user's express and/or inferred preferences, such as those described elsewhere herein. Optionally, activation of the drill-down control 306B will cause a listing of such subgenres to be displayed, where the user can select one or more the subgenres, and the selected representations of content items of the selected subgenres will be provided for display.

If the search terms did not include a genre, activation of the drill-up control 304B may cause content items that did not as closely match the search query as the current content items to be displayed, and activation of the drill-down control 306B may filter out content items that were poorer matches from being displayed so that only a subset of the original search results will be displayed.

Activation of the scroll left control 308B or the scroll right control 310B may cause the displayed content items to respectively cause the displayed content items to be scrolled left or right so that certain content items that were offscreen will now be displayed.

Figure 3C:
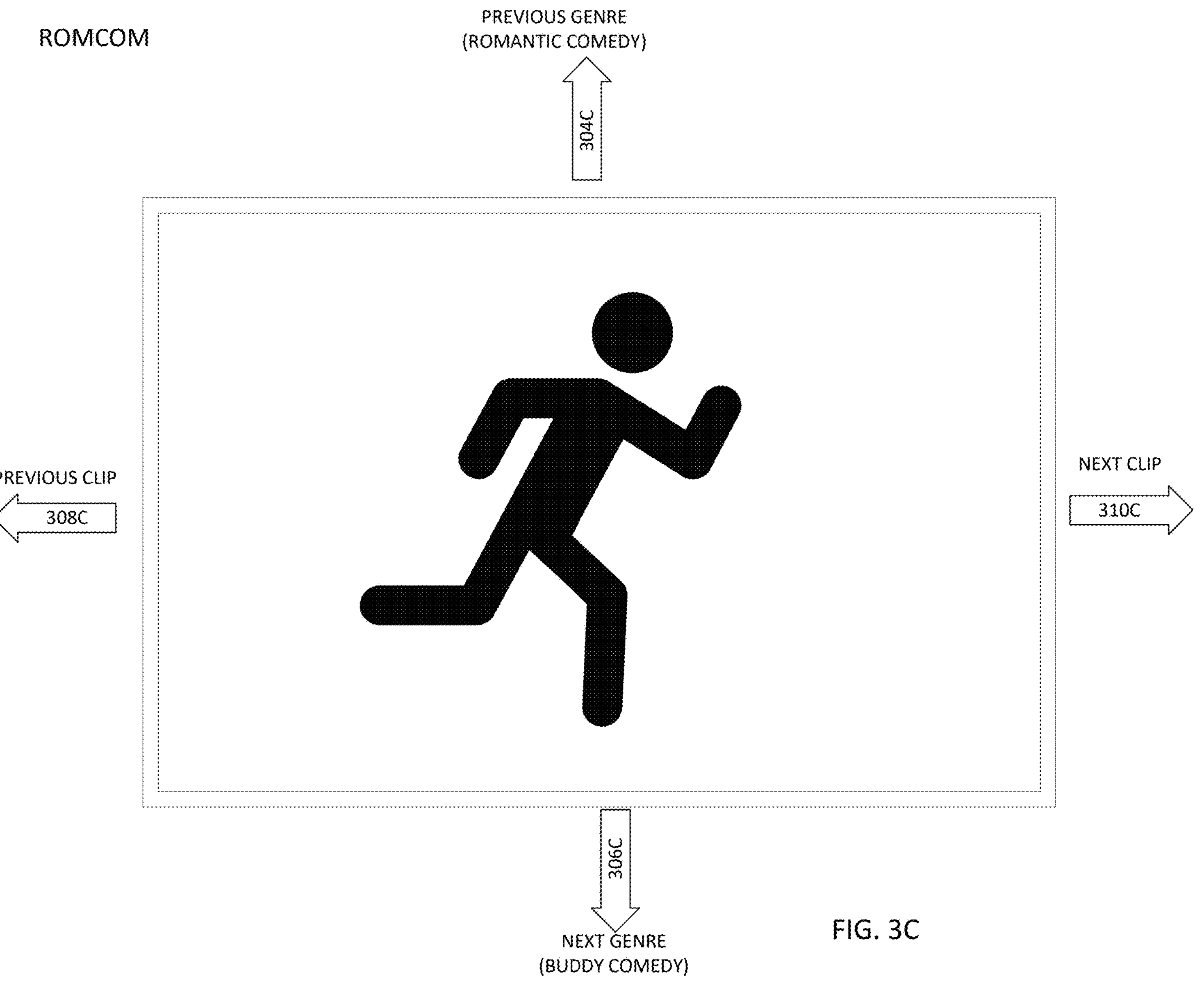

Referring now to FIG. 3C, an example user interface displays a content item preview, with an identification of the associated category/genre (romcom), and with navigation controls. The navigation controls may include a navigate up arrow control 304C that when activated will cause the user interface to play a preview from a previous genre/category (e.g., displayed in a different row, such as the row immediately above, of content items corresponding to a specified different genre/category). The navigate up arrow control 304C may be displayed in association with text that identifies the category/genre that will be navigated to, if activated. A navigate down arrow control 306C is displayed that when activated will cause the user interface to play a preview from a next genre/category (e.g., displayed in a different row, such as the row immediately below, of content items corresponding to a specified genre/category). The navigate down arrow control 306C may be displayed in association with text that identifies the category/genre that will be navigated to, if activated. A navigate left arrow control 308C is displayed that when activated will cause the user interface to play a preview from a previous content item in the same genre category or grid row (romcom in this example). A navigate right arrow control 310C is displayed that when activated will cause the user interface to play a preview from a next content item in the same genre category or grid row (romcom in this example).

A user may access a user interface of on-demand content, with corresponding content item (e.g., movies, television shows, etc.) representations depicted (e.g., thumbnail images and/or text identifying respective content items). Thus, for example, a user may launch a connected television streaming application and access a video on-demand user interface. Optionally, the user interface may arrange the content items in multiple rows, where optionally each row (or set of rows) represents a different category or genre of content items (e.g., newly posted content items, popular content items, action/adventure content items, comedy content items, mystery content items, science fiction/fantasy content items, other genres of content items, etc.).

The user may focus on a given item of content and provide a preview instruction. For example, the preview instruction may be provided by a user pressing a specified button (e.g., a remote control button, such as an "OK" or "Play" button) for more than a specified threshold of time or by providing a voice command. In response to the user providing a preview instruction, a content preview screen (e.g., a window or panel) may be displayed and the preview clip may be loaded and played via the content preview screen (which may be configured as a video player overlay that appears to overlay, and visually hide, an underlying user interface, such as an on-demand, video station, or search results user interface). Optionally, metadata associated with the content item and/or the content item preview may be accessed and displayed (e.g., overlaying, above, below, on the left, and/or right side of the preview clip, or otherwise). Each preview may optionally be of the same or approximately the same time duration (e.g., 10, 15, or 20 seconds), or optionally different previews may be of different time durations.

After a given preview is played for a given content item in a grid row, the preview for the next content item in the row is automatically played, and so on, until the preview for the last content item in the row is played. The sequence may be left-to-right or right-to-left (e.g., in response to a localization indication, where optionally in countries where sentences are read from right to left, the preview sequence will start with the rightmost content item in a row, and in countries where sentences are read from left to right, the preview sequence will start with the leftmost content item in a row). After the preview for the last content item in the row is played, a preview for the first content item in the row below (which may correspond to a different category than the previous row) may be played. Optionally, after the preview for the last content item on the bottommost row is played, the preview for the first content item in the first row is played again, so that the previews may cycle in a circular fashion. Optionally, after the preview for the last content item on a given playlist, station, grid row or the last content item on the bottommost row is played, the user interface from which the user activated the preview mode (which may be referred to a "peek view") may be returned to and presented.

Optionally, the user interfaces described herein (e.g., grids/rows of content items) may be navigated via a remote control (e.g., a physical, dedicated remote control device, or a remote control application hosted on a user device, such as on a mobile phone) configured to control a content display device (e.g., a connected television hosting a content streaming application which may detect and act on user navigation inputs). For example, navigation may be performed via a physical or virtual remote control directional pad ("D-pad"). In a physical instantiation, the D-pad may include a pad overlaying four directional buttons (up, down, left, right) arranged in a cross pattern. The buttons are optionally pressure-sensitive, and the direction and/or amount of pressure applied may be used to determine the movement or action to be taken. Optionally, the remote control may include a control, such as an OK button, that may be used to confirm a selection or action.

For example, when navigating through a set of content items (e.g., a grid of content items) or menus presented via the television, the D-pad directional buttons may be utilized by a user to navigate to and highlight an option (e.g., a content item). For example, if a user navigates to a content item in a grid of content items, that content item may be visually highlighted (e.g., with a distinct boarder about a thumbnail representing the content item, by expanding the size the thumbnail, by pulsing the thumbnail, by bolding text, and/or otherwise). The user may then press the OK button to select it. For example, if a content item is highlighted, pressing the OK button may cause the playing of a preview to be initiated by a streaming application hosted by the television.

By way of further example, pressing the right D-pad button while a content item preview is playing may cause the application to stop playing the currently playing preview, and begin playing the preview for the content item immediately to the right in the grid row/category (or if the currently playing preview is for a content item that is the last item in a row, begin playing the preview for the first content item in the row).

By way of yet further example, pressing the left D-pad button while a content item preview is playing may cause the application to stop playing the currently playing preview, and begin playing the preview for the content item immediately to the left (or if the currently playing preview is for a content item that is the first item in a row, begin playing the preview for the last content item in the row) in the grid row/category (which may have been previously played).

By way of still further example, pressing the up/top D-pad button while a content item preview is playing may cause the application to stop playing the currently playing preview, and begin playing the preview for the content item in the row/category above, in the same column or index position.

By way of further example, pressing the down/bottom D-pad button while a content item preview is playing may cause the application to stop playing the currently playing preview, and begin playing the preview for the content item in the row/category below. in the same column or index position.

By way of still further example, a back button may be provided, which if pressed while a preview is playing will stop the playing of the preview, cause the preview overlay screen/window to close, and cause the user interface to return to displaying the underlying grid.

It is understood that different buttons or other controls may be used to perform the above functions.

A preview of a given content item may be initiated in one or more ways, where the given content item may be selected for preview in accordance with one or more rules and criteria. For example, a preview for a selected content item (e.g., the topmost displayed content item, the topmost-leftmost content item, a randomly selected content item, a content item determined to most likely to be liked by the user, the most recently available-for-streaming content item, etc.) may be automatically initiated a predetermined amount of time after a set of content items are displayed on a user device (e.g., where the content items may be displayed as a grid, list, carousel, or otherwise). Optionally, a preview of a given content item may be initiated in response to a user action with respect to the content item. For example, a preview may be initiated in response to the user clicking on the content item, hovering a cursor or pointing at the content item, speaking the name of the content item with a spoken "preview" instruction, or otherwise.

A preview may automatically be played in full screen mode (although certain controls and data may be displayed overlaying portions of the preview). During the preview and/or a threshold amount of time after the preview has completed the user may provide an instruction to play the previewed content item (e.g., by clicking on a play control or providing a voice instruction). If the selected previewed content item is a video-on-demand content item, the video may begin playing from the beginning. If the content item is a time scheduled content item (e.g., associated with a start and end time and a channel in accordance with a program guide), a control may be provided via which the user can specify that the content item is to be recorded for later viewing and/or a via which the user can specify that a reminder is to be provided to the user (e.g., via an application push notification, via a messaging service notification, via an email, or otherwise) at a specific time or predetermined amount of time prior to the start time of the content item.

Optionally, in addition to or instead of a playback control, controls (e.g., accessed via a menu control, a voice command, and/or by right clicking on the preview or content item representation) may be provided via which the user may add the content item to a watchlist for later viewing (where the user may access the watchlist via a corresponding control and select a watchlist item for immediate playback), provide a like indication with respect to the content item, request that similar content items be displayed, or create a video channel/station/playlist comprising the content item and similar content items (e.g., of similar genre, including one or more of the same actors, and/or the like).

Such a channel/station/playlist may be generated in real time in response to a user selecting an item of content in an electronic program guide (such as described herein), video-on-demand user interface (such as described herein), in search results (such as described herein), or otherwise. Previews may be sequentially played for each content item in the channel/station/playlist, until the user halts such sequential playing of previews, such as by indicating that a content item be played, in response to activation of a back control, and/or otherwise. A user interface may enable a user to navigate among previews as described elsewhere herein.

Optionally, as a given preview is being played for a content item, an interface may be provided via which the user can indicate if the user likes or dislikes a currently playing (or just completed) preview. Based on such like or dislike indication, the channel/station/playlist may be dynamically regenerated to reflect the user's input (e.g., to include content items similar to a content item preview the user liked, to exclude include content items similar to a content item preview the user disliked, etc.).

Thus, for example, previews may be sequentially presented for a user-specific video content playlist or station (e.g., manually created by the user or automatically generated based on a user's profile, preferences, viewing history, like indications, dislike indications, and/or other data described herein), as similarly discussed herein with respect to FIGS. 3A and 3B. The preview sequential presentation may be initiated in response to the user providing a preview instruction (e.g., by holding down a play control for more than specified period of time or activating a preview-specific control).

Optionally, if a user has already viewed a given content item in a video content playlist, station, and/or search result, the preview for that content item will not be played during the sequential playing of content item previews for the content playlist, station, or search result. Optionally, a control may be provided via which the user can specify whether or not a preview for an already-viewed content item is to be played during a sequential playing of content item previews, and the streaming application may in response provide previews in accordance with the user's instruction provided via the control.

If the user does not provide a play instruction, optionally, the set of content items (e.g., the grid of content items illustrated in FIG. 3A or the search results illustrated in FIG. 3B) may be displayed for a predetermined amount of time, and then, if the user does not provide any instruction, a preview of another of the displayed content items may be automatically selected and initiated. Optionally, the preview process may be initiated in response to a user command (e.g., pressing a play or enter control for at least a threshold period of time, providing a preview voice command, or activating a dedicated preview control). As before, the preview may optionally be automatically displayed in full screen mode. Optionally, the preview of another of the displayed content items may be automatically selected and initiated without displaying the set of content items in between the previews.

The content item may be selected for the next preview based on one or more parameters. For example, the content item may be selected based on its displayed location relative to the just-played content item preview (e.g., the content item immediately to the left, right, below, or above the previously previewed content item, or a content item at the beginning (right side) of the next row of content items). By way of further example, the content item may be selected for preview based on a suitability score/ranking that indicates how likely it is that the user will like and want to view a respective content item. The suitability score and/or suitability ranking may be based on some or all of the express and/or inferred user preferences or other user characteristics, such as those described herein. By way of yet further example, the content item may be selected for preview based on how recently the content item was added to the streaming library.

As discussed elsewhere herein, an aspect of the present disclosure relates to the utilization of heuristics and learning engines (which may be included in preview generation service 210D) to generate and/or select customized previews for a given user or set of users. Such customized previews greatly increase the speed and accuracy with respect to a viewer determining whether or not to view a program, thereby reducing the amount of backend server resources needed to fulfill the content discovery function.

Optionally, a customized model comprising a learning engine may be generated for a specific user or set of users. Where a customized model is generated for a set of users comprising a plurality of different users, the set of users may be selected based on one or more common characteristics, such as one or more express and/or inferred content preferences. By way of example, a similarity score or other metric may be generated for a given user relative to another given user or set of a plurality of users based on how many and/or which preferences they have in common (where optionally certain preferences may be weighted more or less than other preferences).

The customized model may be configured to select scenes of a specific length or of varying lengths (optionally with a maximum, not-to-exceed length) from a content item to be included in a preview based on the user's preferences (express and/or inferred preferences) and the subject matter of various scenes in the content item. For example, if the user has a preference for car chase scenes, the model may select one or more scenes (if any exist) from the content item that is primarily (e.g., more than 75% or other threshold amount of time) of a car chase. The scenes may have been identified as having a car chase (or other subject) by automatically or manually tagging the video item with metadata that identifies a beginning time and an end time of each car chase scene in the content item.

For example, the metadata may have been added by a person trained to label scenes and/or the metadata may have been crowdsourced by end users (e.g., subscribers) that viewed the content item. Optionally, the metadata may have been added by a learning engine configured to identify content subject matter based on images of items (e.g., vehicles moving at high speed) and/or sound (e.g., screeching tire sounds, rumbling engine sounds, etc.).

A learning engine may be configured to perform scene boundary detection (e.g., using changes in the color, brightness, or motion of the frames, and/or using audio analysis to detect changes in the audio track) to localize where scenes (e.g., a series of shots depicting a semantically cohesive part of a story, while a shot is a series of frames captured by the same camera over an uninterrupted period of time) in a video content item begin and end. The learning engine may be trained using unsupervised learning, self-supervised learning, or supervised learning. For example, a shot may be identified using a color histogram and/or activity measuring clustering. By way of further example, scene detection may be performed by analyzing the motion vectors of video frames. Such analysis may identify sudden changes in the motion vectors or by identifying a pattern of motion vectors that indicate a scene change. By way of further example, scene detection (e.g., a scene start and/or a scene end) for a video can be performed in whole or in part using audio, where the audio signal is analyzed for changes in volume, frequency, and/or other characteristics. These changes can be used to detect when a scene has changed in the video.

Once the learning engine configured to perform scene boundary detection identifies the scene boundaries in a given video content item, one or more other learning engines (e.g., a convolutional neural network learning engine) configured to identify one or more movie scene types (e.g., the scene subject matter, such as car chase, explosion, kiss, dancing, etc.) may be used to analyze a given scene and assign scene descriptive metadata identifying the scene types. For example, a learning engine may be configured to detect an action scene based on the rhythm of a given scene and objects identified within the scene (e.g., gun, knife, bomb, car, motorcycle, etc.). A learning engine may comprise a convolutional neural network including an input layer, an output layer, one or more hidden layers, and a pooling layer. The neural network may be trained using an object-centric dataset and/or a scene-centric dataset. Advantageously, the neural network is configured to exploit spatially-local correlations. Neural network neurons may be replicated across the visual space so that features can be recognized regardless of position in a visual field. By way of further advantage, because neuron weights are shared, the efficiency is increased by decreasing the number of learnable parameters by gradient descent.

The customized model, used to select preview scenes for a given user or set of users, may be updated based on how often the user or sets of users played the content item corresponding to the preview either partially and/or to substantial completion (e.g., watched the entire content item, optionally excluding the credits), to enhance the model accuracy.

Thus, for example, if the user has a preference for car chase scenes and gunplay, the disclosed process may identify, by reading metadata for a given content item (e.g., a movie or television show), scenes containing car chases scenes and gunplay.

The system may also determine how popular such scenes are with respect to other users generally and/or with respect to other users having similar preferences to the user (e.g., as determined through a similarity score based on the number of matching preferences, where optionally certain preferences may be weighted differently than others). The scene popularity may be determined by how often a scene is rewound and rewatched and/or paused. A given scene may be assigned a popularity score. Such a popularity score may be utilized in selecting scenes for inclusion in a preview.

A preview may be assembled from clips from the relevant scenes of interest, where a clip may be a full scene or a portion of a scene. The process may determine (e.g., by accessing corresponding settings stored in memory) a minimum clip length and a maximum clip length for the preview and a maximum total preview length. Thus, for example, a minimum clip length may be set to 5 seconds and a maximum clip length may be set to 15 seconds, although other values may be used (e.g., a minimum clip length in the range of 1-5, seconds, 1-10 seconds, 1-15 seconds, or 1-30 seconds, and a maximum clip length in the range of 5-10 seconds, 5-15 seconds, 5-30 seconds, or 5-60 seconds). The process may determine (e.g., by accessing settings stored in memory) a minimum and/or maximum preview length (e.g., 30 seconds-120 seconds, such as 60 seconds, 90 seconds, 120 seconds, or other value) and may select clips to populate the preview length. Clips that do not satisfy the minimum and maximum clip length parameters may optionally be excluded from inclusion in the preview. The process may first populate the preview with the most popular clips (e.g., clips that satisfy a first popularity score threshold) that satisfy the maximum and minimum clip length parameters, without exceeding the maximum preview length. If there are insufficient clips, that satisfy the first popularity threshold, to satisfy the minimum preview length, the remaining preview time may be populated using clips that did not satisfy the first popularity threshold (where the clips in this group may be selected in descending popularity score order) or using default clips (e.g., a portion of the beginning of the content item corresponding to at least the remaining time needed to populate the preview to the minimum preview length without exceeding the maximum preview length).

The order of presentation of the clips selected to be included in the preview may be based on one or more parameters. For example, optionally, the clips may be positioned to appear in a time ordered sequence, where the clip that first appears in the content item is played first, the clip that is the second to appear in the content item is played second, and so on. Optionally instead, the clips may be positioned to be played in order of popularity (e.g., with the most popular played first, the second most popular played second, etc.). Optionally instead, the clips may be positioned to be played in order of time length (e.g., where the longest clip is played first, the second longest is played second, etc.). Optionally, a hybrid technique may be utilized where those clips that satisfy a popularity threshold are displayed in a time ordered sequence, and clips that did not satisfy the popularity threshold are displayed subsequently (e.g., in a time ordered sequence).

The preview may be generated for a user while the user is accessing the streaming application or while the user is not accessing the streaming application. For example, the previews may be generated "just-in-time" for content items that will be displayed as illustrated in FIG. 3A in response to the user opening the streaming application on the user device. Optionally, the previews may be generated and stored while the user is not accessing the streaming application, such as a time of relatively low system utilization for streaming to reduce system loading. Then, when the user launches the streaming application, some or all of the previews for the initial set or anticipated set of content items that will be displayed to the user may optionally be preloaded by transmitting the previews to the user device so that they may be played to the user without delay when the preview display process described elsewhere herein is executed.

Figure 4A:
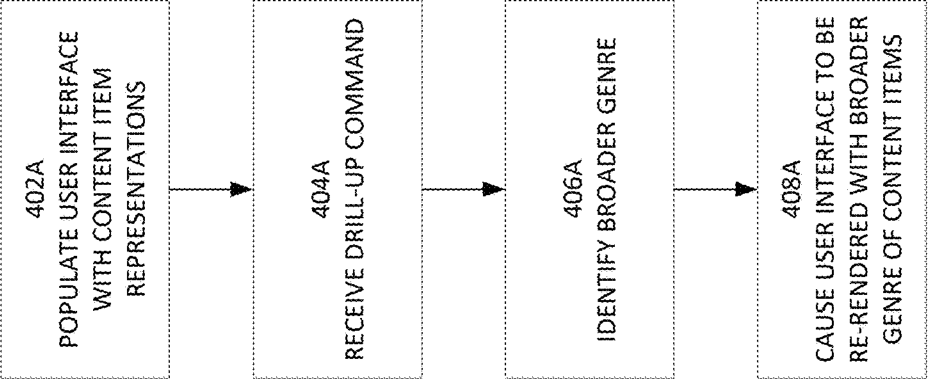
FIG. 4A-4C illustrate example processes.

Referring to FIG. 4A, an example drill-up navigation process is illustrated. At block 402A, a user interface is populated with a set of representations of content items (e.g., video programs displayed in a grid or other format). The user interface may be populated using images and data transmitted from a remote system, such as a remote streaming system (which may be a cloud-based system) and presented by a streaming application on a user device (e.g., a connected TV). The set of content items may be associated with a genre or a subgenre (where the subgenre may be a sub-subgenre of a broader genre). The content items may optionally have been selected as described elsewhere herein. At block 404A, a drill-up command is received from the user. For example, the drill-up command may be received by the streaming application via the user activating a drill-up control (e.g., clicking on a drill-up control, hovering a cursor over a drill-up control, providing a drill-up voice command). The streaming application may transmit the drill-up command to the remote streaming system.

At block 406A, a broader genre corresponding to the drill-up control activation is identified relative to the current genre or subgenre being displayed. For example, a tree structure or the like may be defined where a given first level branch corresponds to a first genre, a second level branch (that extends from the first level branch) corresponds to a first subgenre of the first genre, a third level branch (that extends from the second level branch) corresponds to a first sub-subgenre of the first subgenre, and so on. In response to a single activation of the drill-up control, the process may navigate up one branch to determine the next broader genre. Optionally, if the user activated the drill-up control multiple times, the process may navigate up a corresponding number of genre tree branches to a corresponding higher level/broader genre tree branch.

At block 408A, the set of content items displayed via the user device is re-rendered to include content items corresponding to the broader genre identified at block 406A.

Figure 4B:
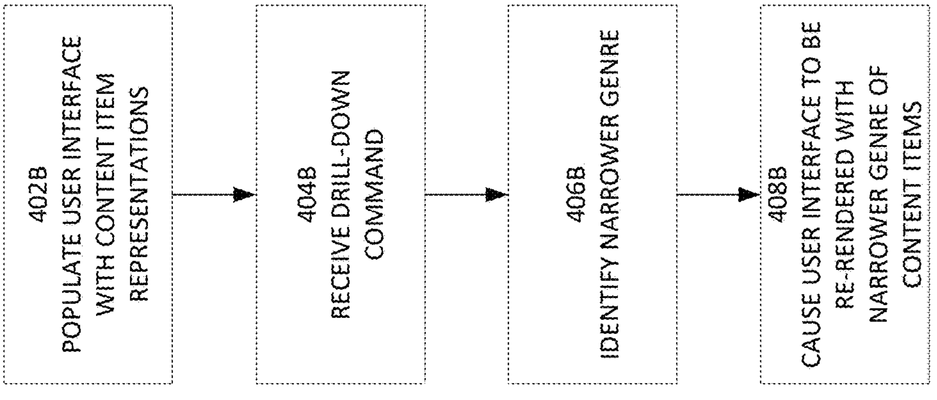

Referring to FIG. 4B, an example drill-down navigation process is illustrated. At block 402B, a user interface is populated with a set of representations of content items (e.g., video programs displayed in a grid or other format). The user interface may be populated using images and data transmitted from a remote system, such as a remote streaming system (which may be a cloud-based system). The set of content items may be associated with a genre or a subgenre (where the subgenre may be a sub-subgenre of a broader genre). At block 404B, a drill-down command is received from the user. For example, the drill-down command may be received by the streaming application (which may transmit the command to the remote streaming system) via the user activating a drill-down control (e.g., clicking on a drill-down control, hovering a cursor over a drill-down control, providing a drill-down voice command).

At block 406B, a narrower subgenre corresponding to the drill-down control activation is identified relative to the current genre or subgenre being displayed. For example, a tree structure or the like may be defined where a given first level branch corresponds to a first genre, a second level branch (that extends from the first level branch) corresponds to a first subgenre of the first genre, a third level branch (that extends from the second level branch) corresponds to a first sub-subgenre of the first subgenre, and so on. In response to a single activation, the process may navigate down one branch to determine the next narrower genre(s). Optionally, if the user activated the drill-down control multiple times, the process may navigate down a corresponding number of genre tree branches to a corresponding genre tree branch. Optionally, where there are multiple subgenre branches extending from a genre branch, the subgenre branch may be automatically selected based on one or more of the user's express and/or inferred preferences, such as those described elsewhere herein. For example, a given branch may be assigned a match score corresponding to how closely the branch genre/subgenre corresponds to the user's interest (where a higher score indicates a closer match).

At block 408B, the set of content items displayed via the user device is re-rendered to include the content items corresponding to the narrower genre identified at block 406B. Previews for one or more of the content items may be played via the streaming application hosted on the user device as described elsewhere herein.

Figure 4C:
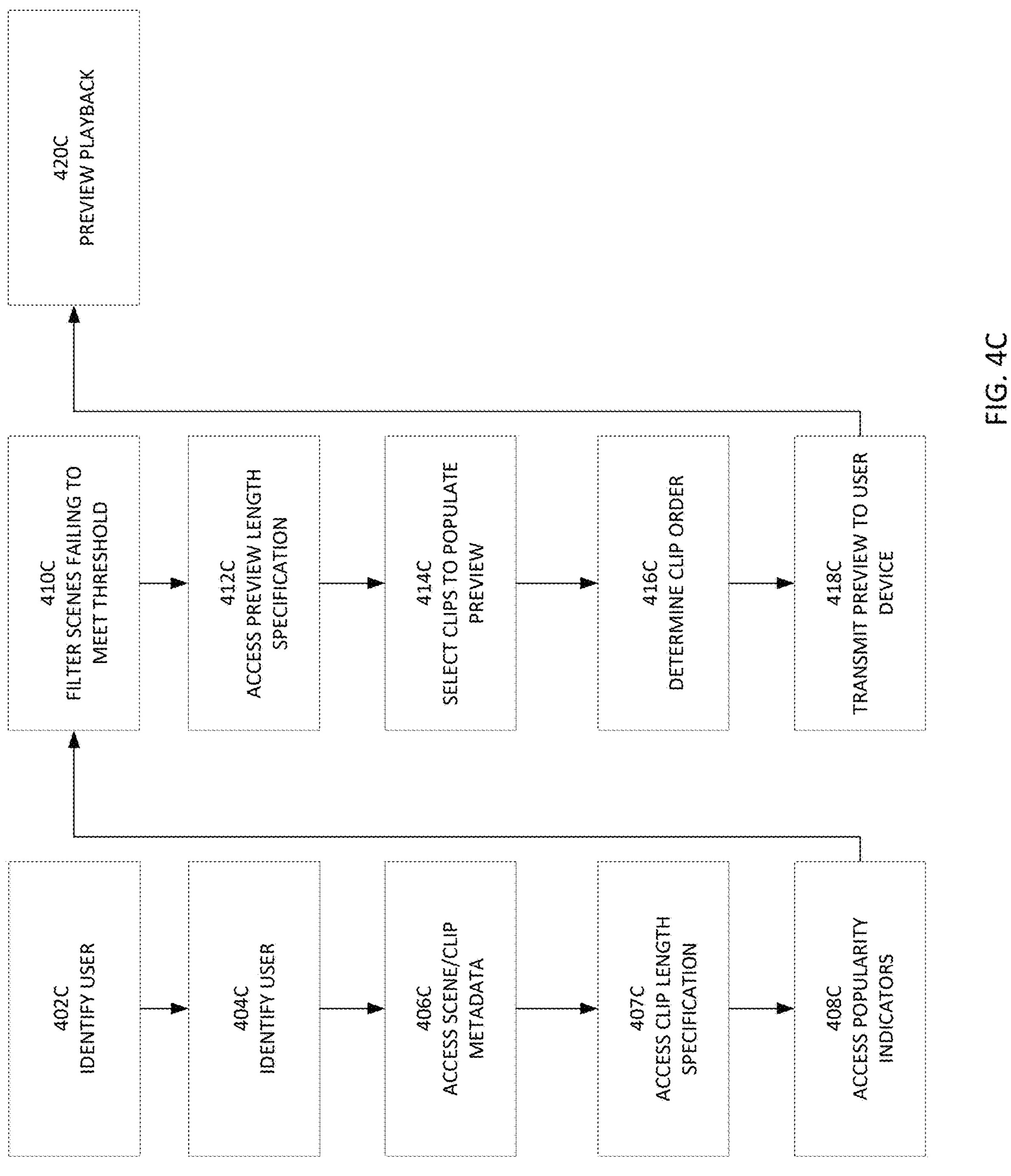

FIG. 4C illustrates an example customized preview generation process for a video preview of a video content item. At block 402C, a user is identified. For example, the user may have a user account comprising preference data, which may include expressly provided preferences and/or inferred preferences, as described elsewhere herein. At block 404C a content item is selected (e.g., where a content item may be, by way of example, a video program, such as a movie, television show, sporting event, news event, and/or the like). The content item may be selected based on when the content item was or will be first made available for streaming via the streaming system, when the content item may be next displayed to the user (e.g., in a library of content items, such as the content item grid illustrated in FIG. 3A), how likely the content item will be of interest to the user (e.g., as determined using the user's preferences as described elsewhere herein), and/or otherwise.

At block 406C, metadata associated with scenes of the content item may be accessed from memory. The metadata may identify the subject matter of the scene, the scene length, and/or other related data. The metadata may optionally have been generated using techniques and processes described elsewhere herein (e.g., generated by a learning engine or manually added by a user).

At block 407C, minimum clip length and/or maximum length specifications may be accessed from memory. At block 408C, clips that fail to satisfy the minimum clip length and/or maximum length specifications may optionally be filtered out from consideration for inclusion in the preview.

At block 408C, popularity scores may optionally be accessed from memory. The popularity scores may optionally be generated using data indicating how often a scene is rewound and rewatched and/or paused. At block 410C, scenes whose popularity scores fail to satisfy a popularity score threshold accessed from memory may optionally be filtered out from at least initial consideration for inclusion in the preview.

At block 412C, a maximum permissible preview length and a minimum permissible preview length may be accessed from memory as similarly described elsewhere herein. At block 414C, scenes that have not been filtered out from consideration for inclusion in the preview may be selected so as to satisfy both the maximum permissible preview length and the minimum permissible preview length. For example, as similarly discussed elsewhere herein, the process may first populate the preview with the most popular clips (e.g., clips that satisfy a first popularity score threshold that satisfy the maximum and minimum clip length parameters, without exceeding the maximum preview length). If there are insufficient of such clips to satisfy the minimum preview length, the remaining preview time may be populated using clips that did not satisfy the first popularity threshold (where the clips in this group may be selected in descending popularity score order) or using default clips (e.g., a portion of the beginning of the content item corresponding to at least the remaining time needed to populate the preview to the minimum preview length without exceeding the maximum preview length).

At block 416C, the order of presentation of the clips selected to be included in the preview is determined. As similarly described elsewhere herein, the order of presentation of the clips selected to be included in the preview may be based on one or more parameters. For example, optionally, the clips may be positioned to appear in a time ordered sequence, where the clip that first appears in the content item is played first, the clip that is the second to appear in the content item is played second, and so on. Optionally instead, the clips may be positioned to be played in order of popularity (e.g., with the most popular played first, the second most popular played second, etc.). Optionally instead, the clips may be positioned to be played in order of time length (e.g., where the longest clip is played first, the second longest is played second, etc.). Optionally, a hybrid technique may be utilized where those clips that satisfy a popularity threshold are displayed in a time ordered sequence, and clips that did not satisfy the popularity threshold are displayed subsequently in a time ordered sequence.

At block 418C, the preview is optionally downloaded to the user device so that the preview may be instantly accessed and presented by the streaming application hosted by the user device at the appropriate moment (although optionally the preview is streamed to the user device for playback upon occurrence of a playback trigger). At block 420C, the preview is played back to the user via the user device (e.g., in response to a time event and/or in response to a user action). For example, as similarly described elsewhere herein, the preview for a content item may be automatically selected and played back based on its physical placement in the set of content items presented to the user (e.g., the preview for the topmost-leftmost content item, may be played first, then the preview for the content item may immediately to the right may be played next, etc.; or a preview for a content item determined to most likely to be liked by the user may be played first, the content item determined to second most likely to be liked by the user may be played second, etc.).

Playback of the preview may optionally be automatically initiated a predetermined amount of time after representations of the set of content items are displayed on the user device (e.g., where the representations of content items may be displayed as a grid, list, carousel, or otherwise). Optionally instead, a preview of a given content item may be initiated in response to a user action with respect to the content item. For example, a preview may be initiated in response to the user clicking on the representation of the content item, hovering a cursor or pointing at the representation of the content item, speaking the name of the content item with a spoken "preview" instruction, or otherwise. The preview may automatically be played in full screen mode (although certain controls and data may be displayed overlaying portions of the preview). During the preview and/or a threshold amount of time after the preview has completed, the user may provide an instruction to play the previewed content item (e.g., by clicking on a play control or providing a voice instruction).

If the selected previewed content item is a video-on-demand content item, the video may begin playing from the beginning in response to the play instruction. If the content item is a time scheduled content item (e.g., associated with a start and end time and a channel in accordance with a program guide), a control may be provided via which the user can specify that the content item is to be recorded for later viewing and/or a via which the user can specify that a reminder is to be provided to the user (e.g., via an application push notification, via a messaging service notification, via an email, or otherwise) at a specific time or predetermined amount of time prior to the start time of the content item.

Optionally, in addition to or instead of a playback control, controls (e.g., accessed via a menu control and/or by right clicking on the preview or content item representation) may be provided via which the user may add the content item to a watchlist for later viewing (where the user may access the watchlist via a corresponding control and select a watchlist item for immediate playback), provide a like indication with respect to the content item, request that similar content items be displayed, or create a video channel comprising the content item and similar content items (e.g., of similar genre, including one or more of the same actors, and/or the like).

If the user does not provide a play instruction, optionally, the set of content items (e.g., the grid of content items illustrated in FIG. 3A) may be displayed for a predetermined amount of time, and then, if the user does not provide any input, a preview of another of the displayed content items may be automatically selected and initiated. As before the preview may be automatically displayed in full screen mode. Optionally, the preview of another of the displayed content items may be automatically selected and initiated without displaying the set of content items in between the previews.

The content item may be selected for the next preview based on one or more parameters. For example, the content item may be selected based on its displayed location relative to the just-played content item preview (e.g., the content item immediately to the left, right, below, or above the previously previewed content item, or a content item at the beginning of the next row of content items). By way of further example, the content item may be selected for preview based on a suitability score/ranking that indicates how likely it is that the user will like and want to view a respective content item. The suitability score and/or suitability ranking may be based on some or all of the express and/or inferred user preferences or other user characteristics, such as those described herein. By way of yet further example, the content item may be selected for preview based on how recently the content item was added to the streaming library.

Figure 5A:
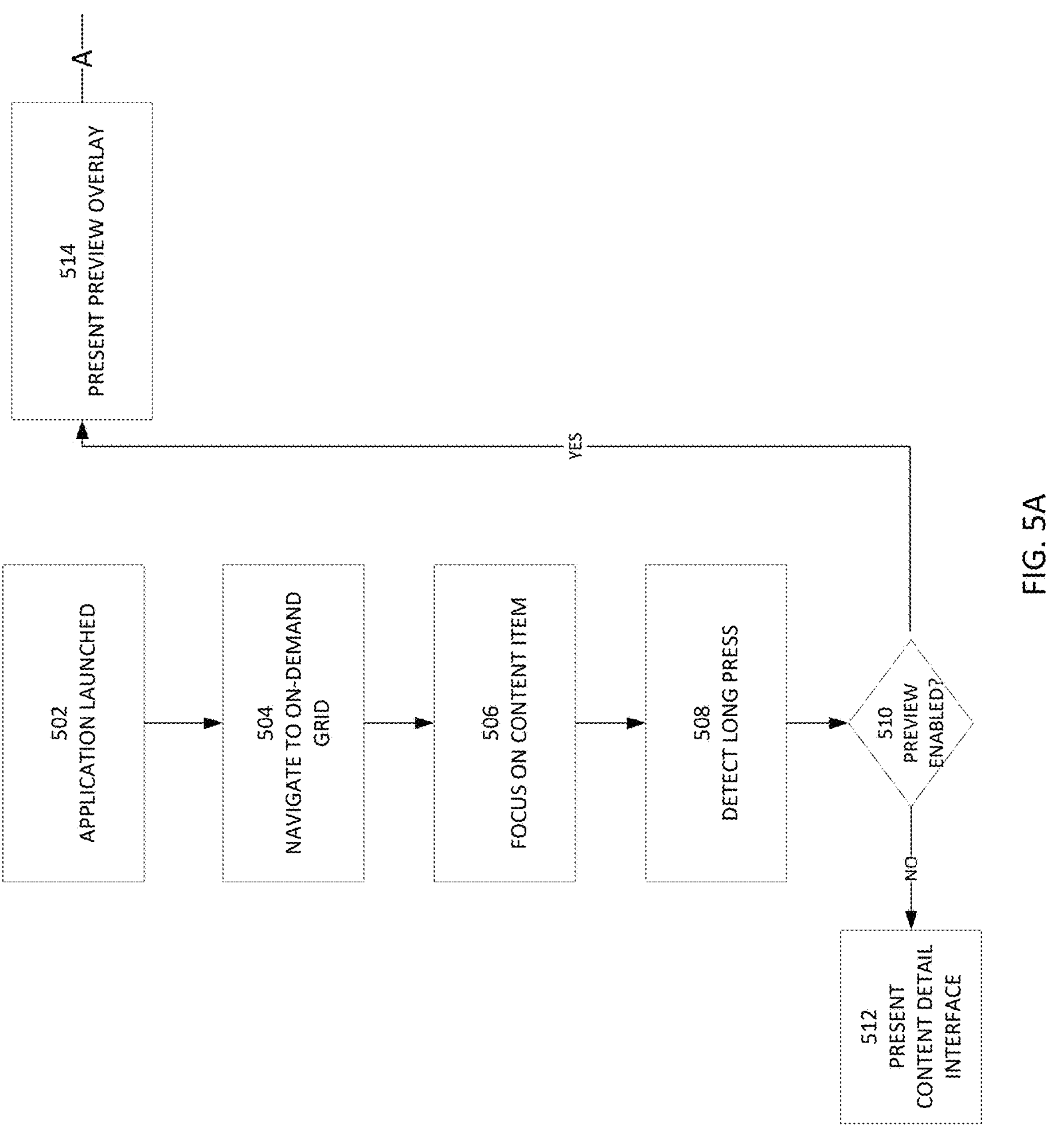
FIGS. 5A-5C illustrate additional example processes.
Figure 5B:
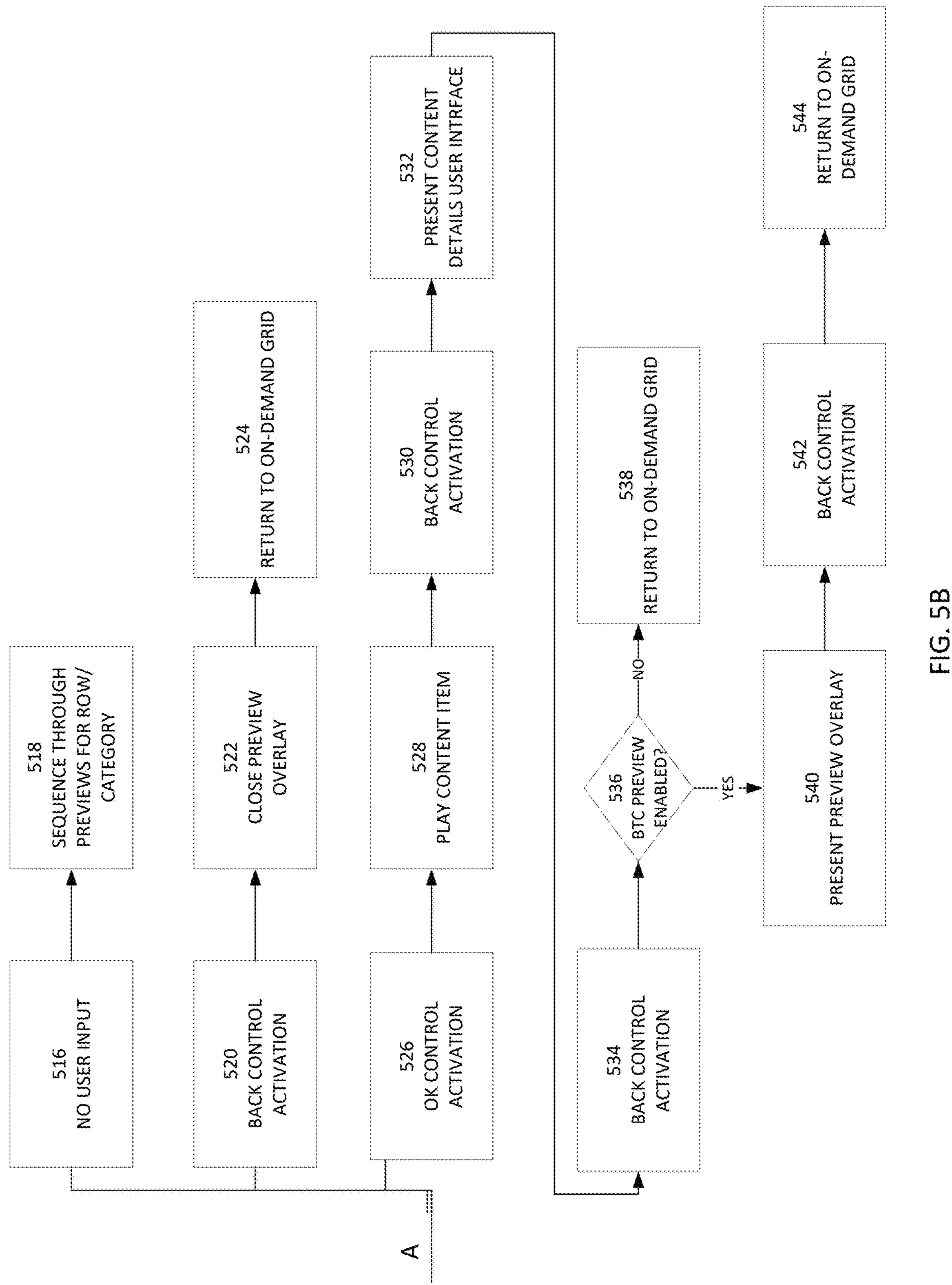
Figure 5C:
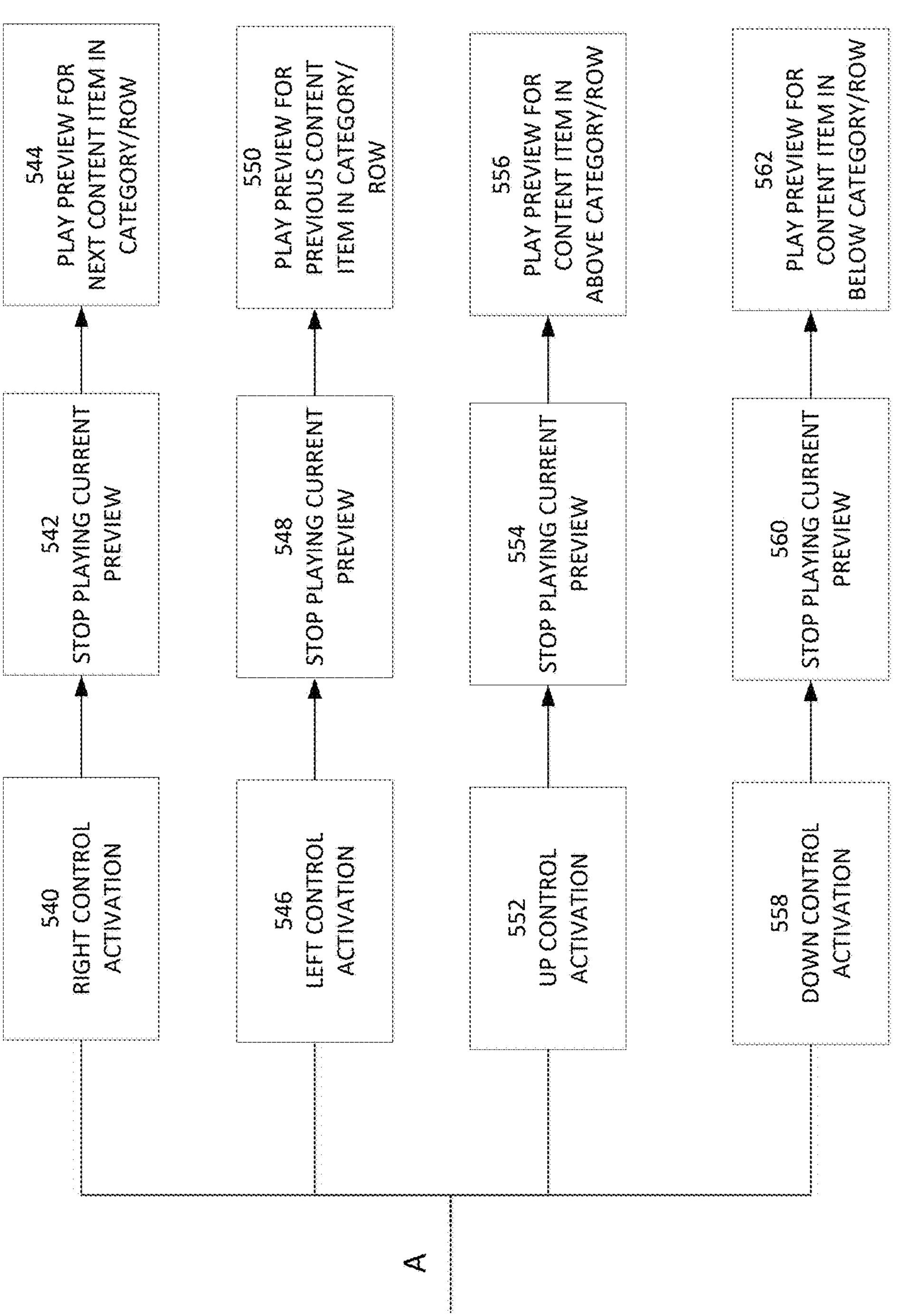

FIGS. 5A-5C illustrates example processes for utilizing an input device, such as a remote control, to navigate amongst content items and previews.

By way of context, a user may access a user interface of on-demand content, with corresponding content item representations (e.g., thumbnail image and/or text identifying the content item, where the content item may be a movie, television show, musical performance, etc.) depicted. Thus, for example, a user may launch a connected television streaming application and access a video on-demand user interface. Optionally, the user interface may arrange the content items in multiple rows, where optionally each row (or set of rows) represents a different category of content items (e.g., newly posted content items, popular content items, action/adventure content items, comedy content items, mystery content items, science fiction/fantasy content items, other genres of content items, etc.).

The user may focus on a given item of content and provide a preview instruction. For example, the preview instruction may be provided by a user pressing a specified button (e.g., a remote control button, such as an "OK" or "Play" button) for more than a specified threshold of time or by providing a voice command. In response to the user providing a preview instruction, a content preview screen (e.g., a window or panel, which may occupy or most of the television display area) may be displayed and the preview clip may be loaded and played via the content preview screen. Optionally, metadata associated with the content item and/or the content item preview may be accessed and displayed (e.g., overlaying, above, below, on the left, and/or right side of the preview clip, or otherwise). Each preview may optionally be of the same or approximately the same time duration (e.g., 10, 15, or 20 seconds), or optionally different previews may be of different time durations.

After a given preview is played for a given content item in a grid row, the preview for the next content item in the row is played, and so on, until the preview for the last content item in the row is played. After the preview for the last content item in the row is played, a preview for the first content item in the row below (which may correspond to a different category than the previous row) may be played (or the preview for the first content item in the current row may be played). Optionally, after the preview for the last content item on the bottommost row is played, the preview for the first content item in the first row is played, so that the previews may cycle in a circular fashion. Optionally, after the preview for the last content item on a given playlist, station, grid row or the last content item on the bottommost row is played, the user interface from which the user activated the preview mode (which may be referred to a "peek view") may be returned to and presented.

Optionally, navigation via the user interfaces described herein (e.g., grids/rows of content items) may be performed via a remote control configured to control a content display device (e.g., a connected television hosting a content streaming application which may detect and act on user navigation inputs). For example, navigation may be performed via a remote control directional pad ("D-pad"). The D-pad may include a paid overlaying four directional buttons (up, down, left, right) arranged in a cross pattern. The buttons are optionally pressure-sensitive, and the direction and/or amount of pressure applied may be used to determine the movement or action to be taken. Optionally, the remote control may include a control, such as an OK button, that may be used to confirm a selection or action.

For example, when navigating through a set of content items (e.g., a grid of content items) or menus presented via the television, the D-pad directional buttons may be utilized by a user to navigate to and highlight an option (e.g., a content item). For example, if a user navigates to a content item in a grid of content items, that content item may be visually highlighted (e.g., with a distinct boarder about a thumbnail representing the content item, by expanding the size the thumbnail, by pulsing the thumbnail, and/or otherwise). The user may then press the OK button to select it. For example, if a content item is highlighted, pressing the OK button may cause the playing of a preview to be initiated.

By way of further example, pressing the right D-pad button while a content item preview is playing may cause the application to stop playing the currently playing preview, and begin playing the preview for the content item to the right in the grid row/category.

By way of yet further example, pressing the left D-pad button while a content item preview is playing may cause the application to stop playing the currently playing preview, and begin playing the preview for the content item to the left in the grid row/category (which may have been previously played).

By way of still further example, pressing the up/top D-pad button while a content item preview is playing may cause the application to stop playing the currently playing preview, and begin playing the preview for the content item in the row/category above. in the same column.

By way of further example, pressing the down/bottom D-pad button while a content item preview is playing may cause the application to stop playing the currently playing preview, and begin playing the preview for the content item in the row/category below. in the same column.

By way of still further example, a back button may be provided, which if pressed while a preview is playing will stop the playing of the preview and close the preview screen/window, and will cause the user interface to return to displaying grid.

It is understood that different buttons or other input devices may be used to perform the above functions.

Referring now to FIG. 5A, at block 502, a content streaming application hosted on a connected television is launched by a user. At block 504, a user navigates to a video-on-demand user interface, such as that described herein, and the video-on-demand user interface is rendered. The video-on-demand user interface may display representations of content items (e.g., thumbnails of images from or representing the content items and/or content item titles) in a grid format (comprising rows and columns or indexed positions). Optionally different rows may correspond to different categories (e.g., different genres and/or other form of categorization, such as newly available content items, most popular content items, most highly rated content items, etc.).

At block 506, a determination is made that the user is focusing on a content item (e.g., has navigated a cursor to a content item). The content item focused on may be visually emphasized (e.g., with a boarder, a size expansion, and/or otherwise). At block 508, a user-issued preview instruction (e.g., by pressing a remote control button (e.g., an OK button).) is detected by the application At block 510, a determination is made as to whether a preview function is enabled for the user and/or the streaming application. If a determination is made that the preview function is disabled, at block 512, a content detail user interface is presented on the television that provides information regarding one or more content items (e.g., title, summary, length, age appropriateness, etc.). If a determination is made that the preview function is enabled, at block 514, an interactive preview user interface is presented. The interactive preview user interface may be presented as an overlay (e.g., overlaying the on-demand grid user interface) and may be utilized to display video previews being played.

Referring to FIGS. 5B and 5C, various example streaming app actions are illustrated that may be performed in response to corresponding user inputs (e.g., via the remote control). Although certain remote control buttons and other user inputs may be referenced, the application may be configured to respond with the same or similar actions to different remote control buttons and user inputs mapped to such actions. It is also understood that although references may be made to an on-demand user interface, the user interface may instead comprises search results, a playlist, or a video station, as similarly described elsewhere herein.

At block 516, if no further user input is detected, the application may play, at block 518, via the preview overlay (comprising a video player), the previews for each content item in a given row sequentially (e.g., the leftmost content item to rightmost content item, or vice versa). Optionally, once the preview for the last content item in the row is played, the preview for the first item in the next row below (or above) is played, and so on. Optionally, after the preview for the last content item on a given grid row is played, the user interface (video-on-demand user interface) from which the user activated the preview mode (which may be referred to a "peek view") may be returned to and presented.

If, instead, while the preview overlay is displayed (e.g., while a preview for a content item is being played), a back control activation is detected at block 520, at block 522 the preview overlay user interface is closed, and at block 524, the on-demand user interface (e.g., in grid format) is displayed.

If, instead, while the preview overlay user interface is displayed (playing a preview for a content item), an OK control (or other control used to confirm a selection) activation is detected at block 526, at block 528 the preview playback is stopped, and the corresponding content item is played (e.g., from the beginning). If, while the content item is being played, an activation of the back control is detected at block 530, at block 532 the content details user interface is displayed. If, while the content details user interface is displayed, at block 534, activation of the back control is detected, a determination may be made at block 536 as to whether a back-to-preview option is enabled for the application and/or the user. If the back-to-preview option is not enabled, at block 538, the on-demand grid user interface may be presented again. If the back-to-preview option is enabled, at block 540, the preview overlay user interface may be presented. If, while the preview overlay user interface is displayed, at block 542, activation of the back control is detected, at block 544 the on-demand grid user interface may be presented again.

If, instead, while the preview overlay is displayed (e.g., while a preview for a content item on a given on-demand grid row is being played), a right control activation is detected at block 540, at block 542 the playback of the current preview may be halted, and at block 544 the preview for the content item immediately to the right on the on-demand user interface row will be played.

If, instead, while the preview overlay is displayed (e.g., while a preview for a content item on a given on-demand grid row is being played), a left control activation is detected at block 546, at block 548 the playback of the current preview may be halted, and at block 550 the preview for the content item immediately to the left on the on-demand user interface the row will be played again.

If, instead, while the preview overlay is displayed (e.g., while a preview for a content item on a given on-demand grid row is being played), an up control activation is detected at block 552, at block 554 the playback of the current preview may be halted, and at block 556 the preview for the content item on the immediately above row (in the same column/index position) will be played.

If, instead, while the preview overlay is displayed (and a preview for a content item on a given on-demand grid row is being played), a down control activation is detected at block 558, at block 560 the playback of the current preview may be halted, and at block 562 the preview for the content item on the immediately below row (in the same column/index position) will be played.

In a further aspect, as discussed above, linear scheduled video content may be presented via one or more channels (e.g., themed channels) according to a program schedule, where a given program may have a scheduled start time and end time. Optionally, in response to a user providing a scan instruction (e.g., by activating a dedicated scan control or by pressing a play or other control for more than a threshold period of time), the streaming application hosted on the connected television may cycle through the channels, presenting a preview of a currently playing content item (in accordance with the electronic program guide) from each channel cycled through for a period of time (e.g., 5 seconds, 10 seconds, or other period of time) in full screen mode (e.g., via a preview overlay) before jumping to a preview for the currently playing content item for the next channel. If the user likes the preview for a given content item of a given channel, the user can activate a play control (or other appropriate control) to stop channel scanning and to stop the preview, and to cause the content item corresponding to the preview to be played.

An enhanced method of synchronizing multiple displays to display data, such as augmented reality content, will now be described. Advantageously, the disclosed techniques do not require a physical cable or a direct wireless communication channel in order to perform such synchronization (although such communication channels may be used). For example, even though the two display devices may not be directly communicating with each other (e.g., via Bluetooth or by being on the same WiFi network), the devices may nonetheless be synchronized (e.g., using optical codes and/or markers associated with corresponding points of a content item) so that what is displayed on a first device affects or is correlated with what is displayed on a second device, overcoming the technical problem of connecting displays while still providing synchronized content.

For example, a first display device may be a connected television hosting a content streaming application as described herein. By way of further example, a second display device may be a mobile device, such as a mobile smart phone, tablet, laptop, or may be a non-mobile device. The second display device may optionally comprise a camera configured to capture images of the first display device.

In an example implementation, an optical code may be embedded in streaming content displayed on the first device that may be read using a camera of the second device. The streaming content may be received from one or more content sources as similarly described elsewhere herein. The optical code may be visible to the human eye or may be non-detectible by a viewer. For example, the optical code may be a 1D or 2D barcode (e.g., a QR code). By way of further example, so that the optical code is not visually detectible by a human viewing the streaming media (so as not to distract the viewer and so as not to occupy valuable display real estate), the optical code may be hidden using steganography. This technique involves hiding data within the pixels of an image. For example, by changing the least significant bit of pixel values for a selected set of pixel, information may be encoded within one or more frames of a content item in a manner not perceptible to the human eye (but which may be detected by an image processing operation on a photograph of the content frame).

For example, to read data hidden in an image using steganography, several image processing techniques can be used, such as one or more of the following example technical solutions:

Least Significant Bit (LSB) substitution: In this method, the least significant bit of the pixel values is replaced with bits from the hidden data as similarly discussed above. To read the hidden data, the process is performed in reverse, (e.g., the least significant bits of the pixel values are extracted and reassembled to form the original message).

Discrete Cosine Transform (DCT): In this method, the hidden data is embedded within the coefficients of a DCT representation of the image. To read the hidden data, the DCT representation of the image is analyzed, and the coefficients that contain the hidden data are extracted.

Spread Spectrum: In this method, the hidden data is spread across multiple pixels of the image. To read the hidden data, the image is analyzed to detect the spread of the hidden data across multiple pixels.

Noise Analysis: In this method, the hidden data is added to the image as noise. To read the hidden data, the image is analyzed to detect the presence of the added noise and extract the hidden data from it.

Thus, advantageously, the foregoing techniques embed data in an image without interfering with a person's perception of the image and without taking up display space. The data may be used to trigger and/or generate augmented reality data to be displayed on a user mobile device as will be described herein.

The second device may have an application downloaded thereon (e.g., from an application store). The second device application may be configured to communicate with the content composer and content transmission system and/or other systems discussed herein. The content composer and content transmission system may in turn communicate with the user's connected television.

Various points of given content item may be associated with corresponding augmented reality data. Respective optical codes, such as described herein, may be embedded (e.g., by the content composer and content transmission system) in content item frames corresponding to such points. The content composer and content transmission system may stream the content item to the user's connected television, which may render the content item via a streaming application hosted on the connected television. When the user points the user device's camera at the playback of the content item at such points, the application downloaded to the user's device may detect the optical code, and in response, display the corresponding reality data. The optical code may include the augmented reality data and/or may include a unique identifier or link corresponding to the augmented reality data. Where the optical code includes a unique identifier or link corresponding to the augmented reality data, the streaming application may utilize such identifier or link to access (e.g., pull) the augmented reality data (e.g., from one or more of the remotes systems described herein or from the mobile device's memory), which it then may display. While the user is viewing the content item by pointing the mobile device's camera at the television, the augmented reality data may appear to overlay the content item being played on the television when viewed via a user interface presented by the downloaded application on the mobile device display.

Optionally, in addition to or instead of utilizing an optical code embedded in one or more frames, a audio code may be embedded in a sound channel/track associated with video content, that provides the same or similar functionality. The playback of the audio code may optionally be configured so as not to be perceptible by a human. For example, the sound generated by playback of the audio code may be in a frequency range above human hearing (e.g., ultrasonic) or may be hidden via steganographic techniques (e.g., using orthogonal frequency-division multiplexing). The encoded audio code may be detected by a microphone of the user's mobile device, and the downloaded application may digitize and transmit the digitized audio code to the content composer and content transmission system, which may in turn push augmented reality data to the user device. The user device may in turn display the augmented reality data while the user is viewing the content item by pointing the mobile device's camera at the television, as similarly described above.

Optionally, rather than having the user's camera equipped mobile device pulling the augmented reality data in response to detecting a corresponding optical code, the augmented reality data may be pushed by the content composer and content transmission system using markers associated with the content item or using timing data. For example, a given content item may be associated with a file that indicates at what times during playback (e.g., 15, 20, 33, 46.5 minutes into playback) there is available augmented reality data. When the content composer and content transmission system detects that the connected television is receiving and/or displaying that corresponding frames of the content item, it may push augmented reality data to the mobile device to be displayed by the application downloaded thereto.

By way of example, the augmented reality data may comprise textual data, static images, video images, animated or non-animated computer-generated images, and/or the like. For example, the augmented reality data may include textual information regarding a content item scene or character currently being viewed (e.g., what a character is "thinking") or may include an overlay (e.g., an item of clothing that is positioned so that it appears to be worn by the character).

Thus, a given item may have associated metadata indicating at what playback points the corresponding augmented reality data is to be displayed to the user (assuming the user is pointing the user device at the connected television display).

Optionally, a text or other communication may be transmitted to the user's mobile device indicating when the user should point the device at the connected television. The communication may be transmitted in response to detecting, at a playback given point, metadata (such as a marker) during playback of the content item indicating that there is associated augmented reality data that will be available to be displayed on a user device in a certain period of time. The communication may be sent from or on behalf of a streaming source, such as a content composer and content transmission system or other source described herein. For example, the communication may be sent via to an SMS address and displayed by a mobile device messaging application. By way of further example, the communication may be presented by the application downloaded to the user device.

Figure 6:
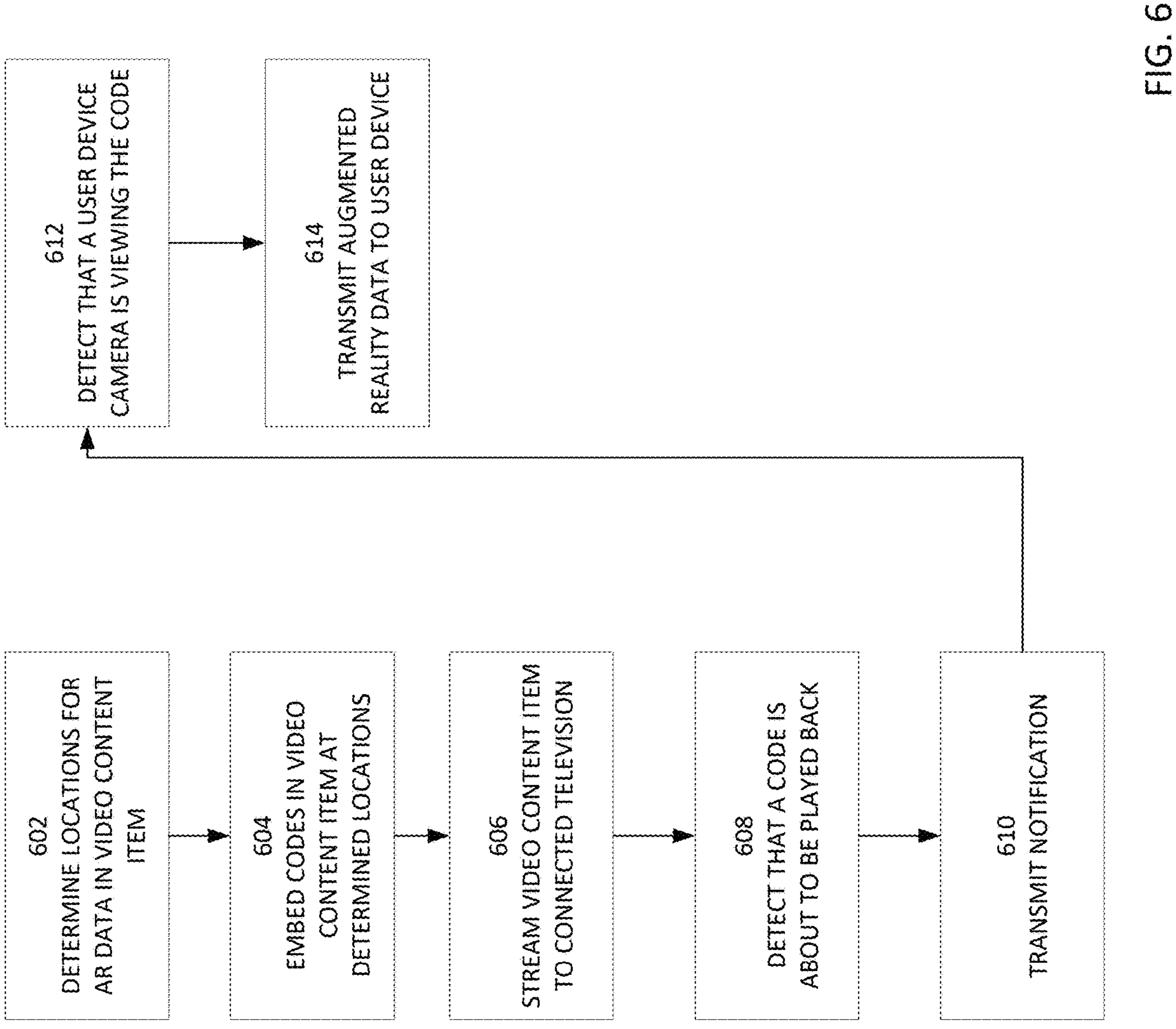
FIG. 6 illustrates an example process.

FIG. 6 illustrates an example process of synchronizing the display of augmented reality content. The process may be executed utilizing systems and devices disclosed herein (e.g., a content composer and content transmission system, a connected television hosting a streaming application, a user mobile device hosting a downloaded application configured to communicate with the content composer and content transmission system). Although the following example process refers to the embedding of optical codes, in addition to or instead, audio codes may be utilized as similarly described above.

At block 602, a determination may made as to what locations/points in an item of video content (e.g., a program, a movie, a commercial, a sporting event, and/or the like) there is to be associated augmented reality data. For example, scenes that are expected to be or that have been determined to be of high interest to viewers may have one or more corresponding frames associated with augmented reality data (e.g., text, graphic, still image, video images, animated content, etc.). At block 604, the video content item frames corresponding to the identified locations may be processed to embed the optical codes. As similarly discussed above, the optical codes may be in the form of a visible optical code (e.g., a one dimensional or two dimensional barcode, such as a QR code) or may be in the form of a hidden code, where the optical code is hidden using steganographic techniques, such as those described herein. Optionally, metadata (e.g., markers) may be associated with a point in time prior to the locations of the optical code. For example, such metadata (which may be referred as trigger metadata) may be set at a point 30 seconds, 60 seconds, 90 seconds, 120 seconds or other time amount prior to a corresponding optical code.

At block 606, the video content item is streamed to a connected television of a user. As similarly discussed elsewhere herein, the video content item may be streamed to the connected television in response to a user instruction or automatically (e.g., as in the case of previews). The connected television may host a streaming application, such as described elsewhere herein, which may receive and playback the video content item. The video content item may be streamed to many user devices (e.g., connected televisions) at the same time in accordance with a start time as indicated in an electronic program guide. The video content item may be streamed on an on-demand basis, where different users may have different start times for the video content item playback, and may be viewing different frames at a given point in time.

At block 608, a metadata trigger may be detected during the video content item playback, indicating that an optical code is about to be played back (e.g., in 30 seconds, 60 seconds, 90 seconds, 120 seconds or other time amount) via the connected television. If the video content item is being streamed on an on-demand basis, the metadata trigger for a given optical code may be detected at different, non-overlapping times. For example, one user may begin viewing the video content item at 8 PM, while another user may begin viewing the content item at 8:13 PM or at 1 AM.

At block 610, a notification is transmitted to a destination (e.g., an electronic address associated with a mobile device of the user, such as a phone number or other messaging service, or to the application downloaded to the user's mobile device) indicating that augmented reality data will be available for an upcoming scene and prompting the user to point the mobile device's camera at the connected television.

At block 612, a determination is made as to whether the user is pointing the mobile device's camera at the connected television. For example, the determination may be based on a detected of the corresponding optical code. The optical code may include the augmented reality data and/or may include a unique identifier or link corresponding to the augmented reality data. At block 614, the augmented reality data may be transmitted to the user mobile device. Where the optical code includes a unique identifier or link corresponding to the augmented reality data, the streaming application may utilize such identifier or link to access the augmented reality data, which it then may display. While the user is viewing the content item by pointing the mobile device's camera at the television, the augmented reality data may appear to overlay the content item being played on the television when viewed via a user interface presented by the downloaded application on the mobile device display. As similarly discussed above, different users may view a given item of augmented reality data at different times depending on what date/time they began streaming the video content item, and depending on whether they paused playback of the video content item.

Certain additional example aspects of content previews will now be described, wherein previews/trailers (which may be referred to herein as "clips") of a set of recommended items of content may be sequentially played, or may be played in accordance with user selections of images corresponding to the previews/trailers of the set of items of content.

Figure 7A:
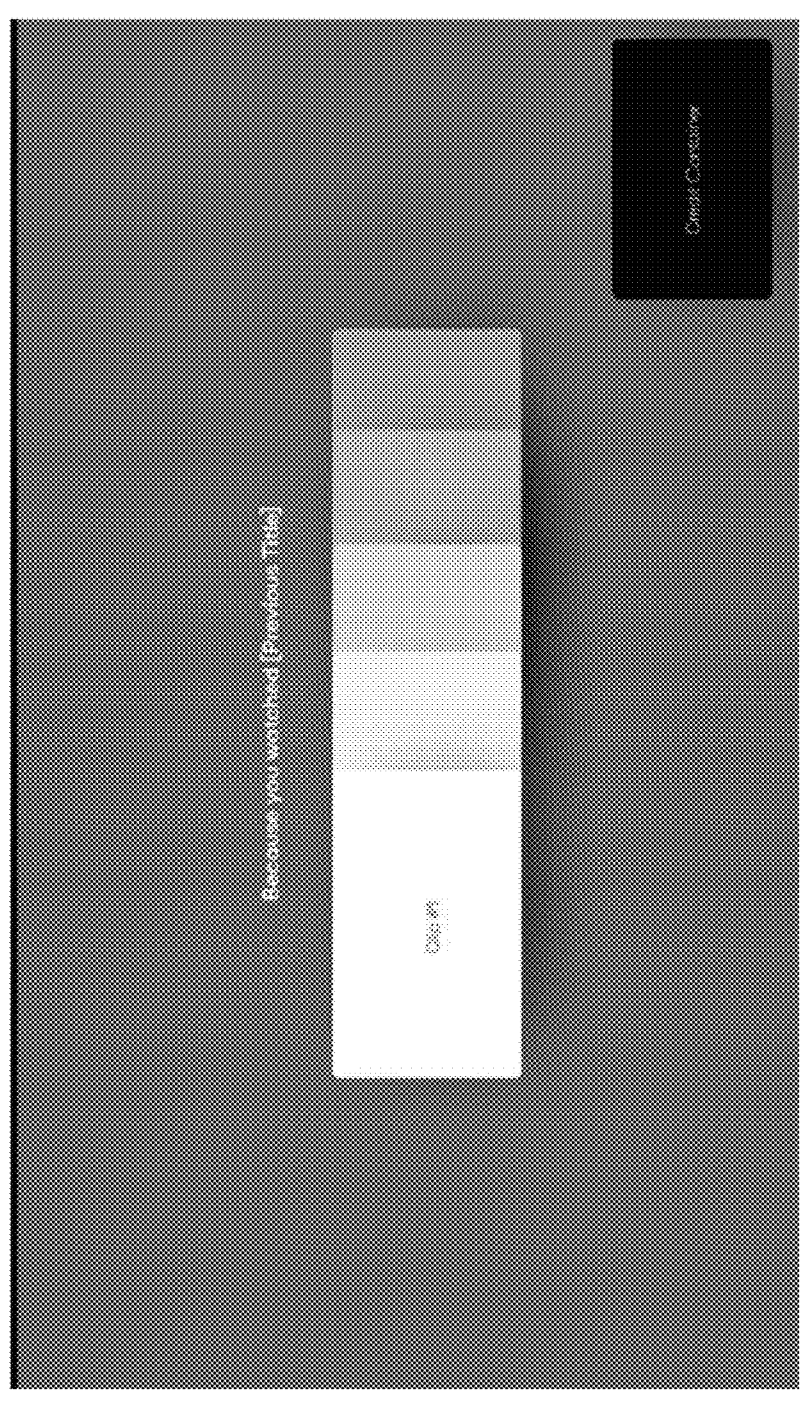
FIGS. 7A-7E illustrate example user interfaces.

Referring to FIG. 7A, once a user finishes viewing an item of content (e.g., a movie, show, sporting event, other type of content described herein, or other types of content) streamed from the content composer and content transmission system to the user device, or in response to the user accessing a certain user interface or activating a corresponding control, the system may transmit to and present via a user device to the user a set of representative images corresponding to recommended items of content (which may be referred to as a "clip stack"). A given image in the clip stack may comprise a corresponding content title and/or artwork (e.g., a photograph or composition) representing the item of content. By way of further example, the images may comprise respective frames from the clip stack (e.g., a movie, show, sporting event, other type of content described herein, and/or other types of content). Such frames may be a first frame or a frame selected as being representative of a corresponding item of content.

Referring to FIG. 7A, a first image for a first item of content may optionally partially overlay a second image for a second item of content, the second image may partially over a third image for a third item of content, and so on. Optionally instead, the clip stack images may be slightly displaced one from another. An explanation as to how the set of items of content corresponding to the clip stack was selected may be generated and displayed (e.g., "Because you watched [name of just completed item of content], you may like the following"). Optionally, credit information (e.g., title, lead actors, director, producer, studio, etc.) for an item of content whose preview is being played or about to be played may be accessed from an associated record stored in memory and/or from associated metadata, and may be transmitted to the user device for display.

In this example, the previews/trailers have not yet begun playing. However, optionally, a preview/trailer of the first item of content may be streamed from the system and may start playing immediately.

As will be described, if not interrupted by the user, once the preview/trailer (clip) of the first item of content completes playing, the preview/trailer of the second item of content may automatically begin playing. If not interrupted by the user, once the preview/trailer of the second item of content completes playing, the preview/trailer of the third item of content may automatically begin playing, and so on. Optionally, as discussed elsewhere herein, if a user selects a given item of content image, the preview/trailer may be played in full screen mode or optionally, the corresponding content item will play in full screen mode (rather than the preview/trailer), and the sequence through the clip stack may be terminated.

Figure 7B:
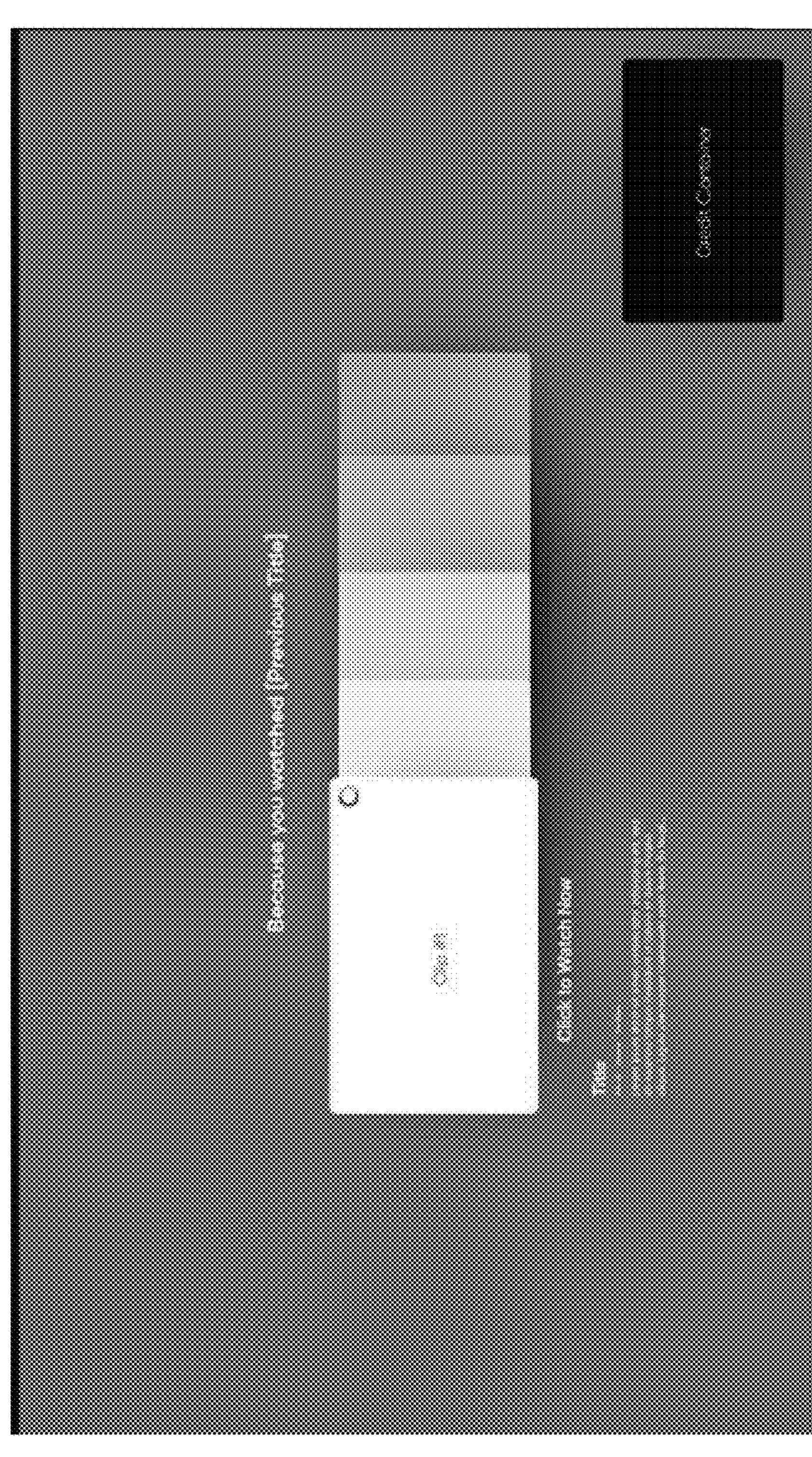

Optionally, the clip stack may be displayed for a predetermined period of time before the first item of content automatically starts playing. In this example, the preview of Clip #1 begins playing after a predetermined time, as illustrated in FIG. 7B.

Optionally the preview of the content set does not start playing until the user activates a corresponding play control (e.g., clicks on the corresponding image or other playback initiation element) for an item of content in the set. Optionally, as will be described, if a preview/trailer for a given item of content is being played and the user selects an image corresponding to another item of content in the set, the playback of the clip of the given item of content may be halted and the playback of the clip of the selected item of content may start. If not interrupted by the user, once the preview/trailer of the selected item of content completes playing, the preview/trailer of the next item of content in the sequence may automatically begin playing, and so on.

Optionally, when a clip of a given item of content begins playing, rather than being played in full screen mode, it may be played in only a portion of the window (e.g., the same size as the image corresponding to the clip), and the images of the other items of content in the set of comments are concurrently displayed in the background, and do not overlay the clip.

Optionally instead, when a clip of a given item of content begins playing, it is played back in full screen mode, and the clip stack is not visible. Once the clip of the given item completes playing (or if the user interrupts the playback by activating a back control, exit control, or the like), the user interface illustrated in FIG. 7A may be again displayed, optionally with the image of the next item of content emphasized (e.g., brought to the foreground, presented in a highlighted frame, or otherwise). Optionally instead, once the clip of the given item completes playing, the clip of the next item in the sequence will automatically begin playing in full screen mode.

The items of content corresponding to the clip stack images may optionally have been selected by the system based a similarity to the item of content the user had just viewed (e.g., similar genre, actors, storyline, etc.), based on collaborative filtering (items of content other users have viewed that also have watched the item of content just viewed by the user), the user's profile, viewing history, user feedback (e.g., like indications, dislike indications, user ratings, or the like), user preferences (e.g., preferred and/or disfavored genres, subgenres, classifications (e.g., for mature audiences only, family friendly, violence, obscene language, sexual situations, smoking, drug use, alcohol use, etc.), actors, directors, screenwriters, languages, time lengths, sports teams, sporting events, musical performers, time of release (e.g., decade in which a content item was released), etc.), other data discussed herein, and/or other data. Other factors may be utilized in addition or instead in selecting the other items of content, such as date, time of day, geographical location, and/or the like.

Figure 7C:
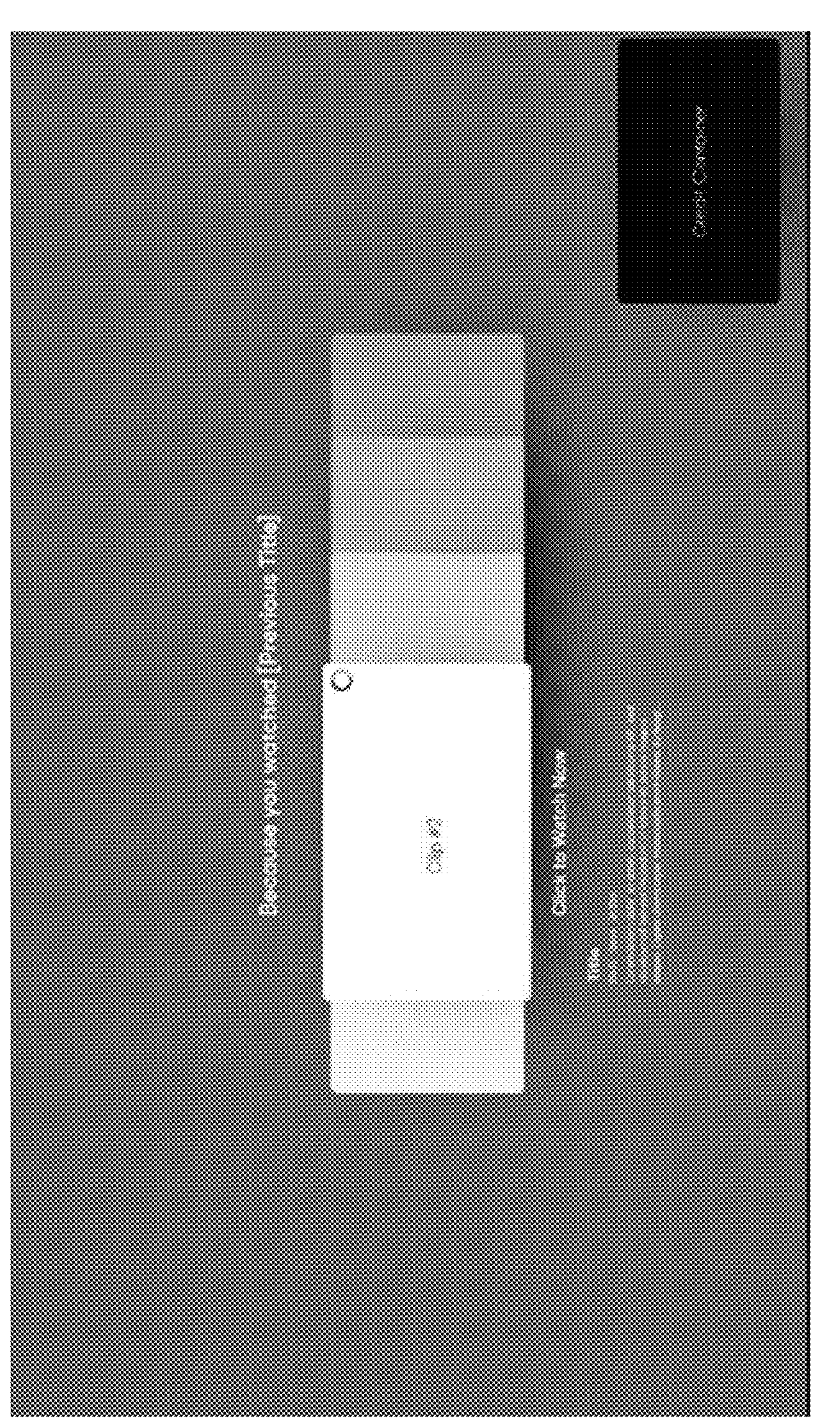
Figure 7D:
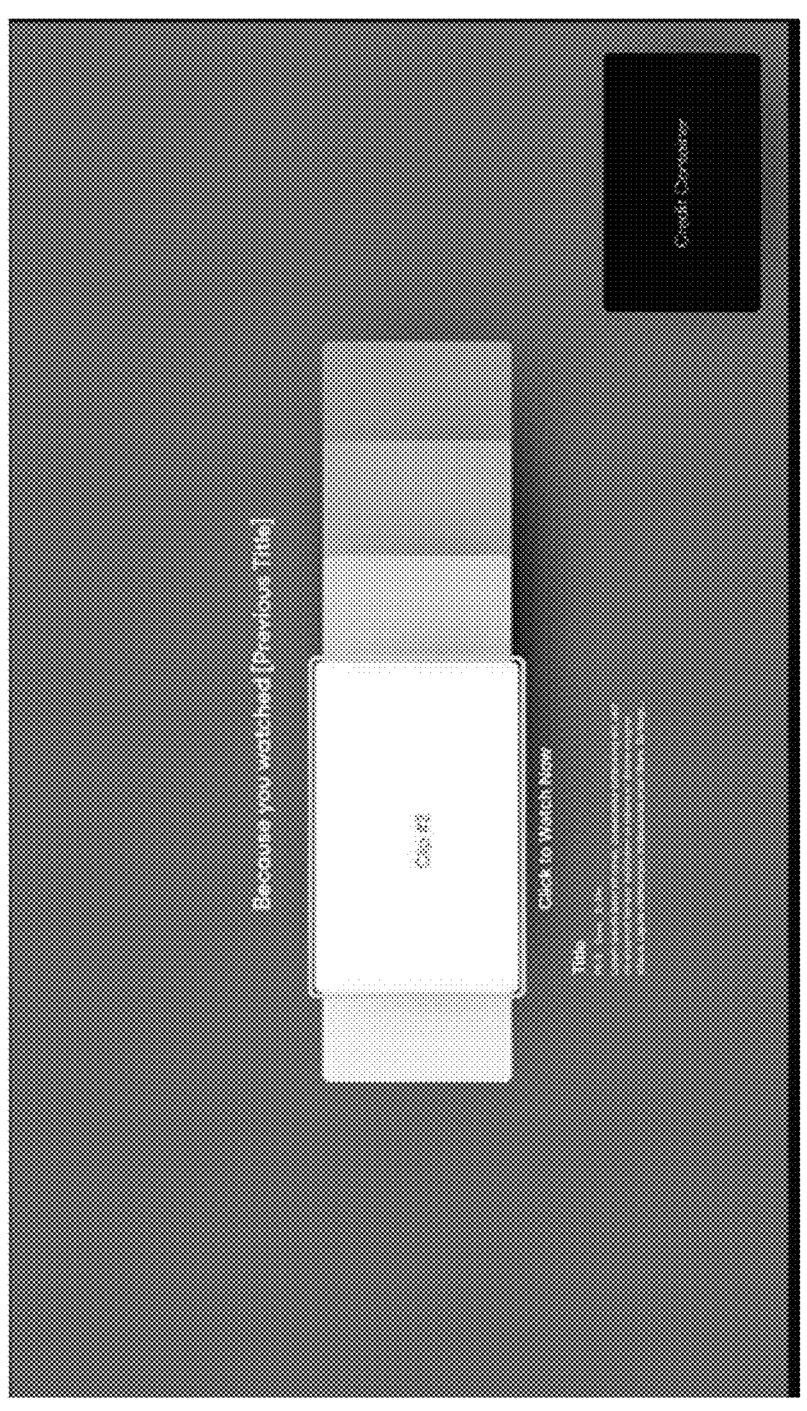

Referring to FIG. 7C, once clip #1 has finished playing, clip #2 will be presented in the forefront. As illustrated in FIG. 7D, in this example, the user has selected Clip #2 corresponding to the second item of content while the clip was playing (e.g., using a remote control to point to and click on Clip #2, by tapping on Clip #2 if the user device comprises a touch screen, or otherwise). The clip is highlighted (e.g., with a boundary box or otherwise). Then, optionally, after a predetermined amount of time or after a sufficient amount of the second item of content has been buffered by the user device, there may be a transition screen displayed (e.g., the screen may fade to black) between the selection of Clip #2 and the playback of the corresponding second item of content. Optionally, buffering of the second item of content by the user device may be performed while the transition screen is displayed.

Figure 7E:

Referring to FIG. 7E, the playback of the second item of content may begin. Optionally, certain data (e.g., metadata associated with the second item of content) may be displayed overlaying the second item of content playback (in a playback area) for a specified period of time, after which the display of the data may cease. Such data may include a maturity rating (e.g., G, PG, PG-13, R, M, etc.), a genre, an episode name, an indication as to whether closed captioning is available, the title of the item of content, the total time length of the item of content, and/or the time remaining in the playback of the item of content.

Figure 8A:
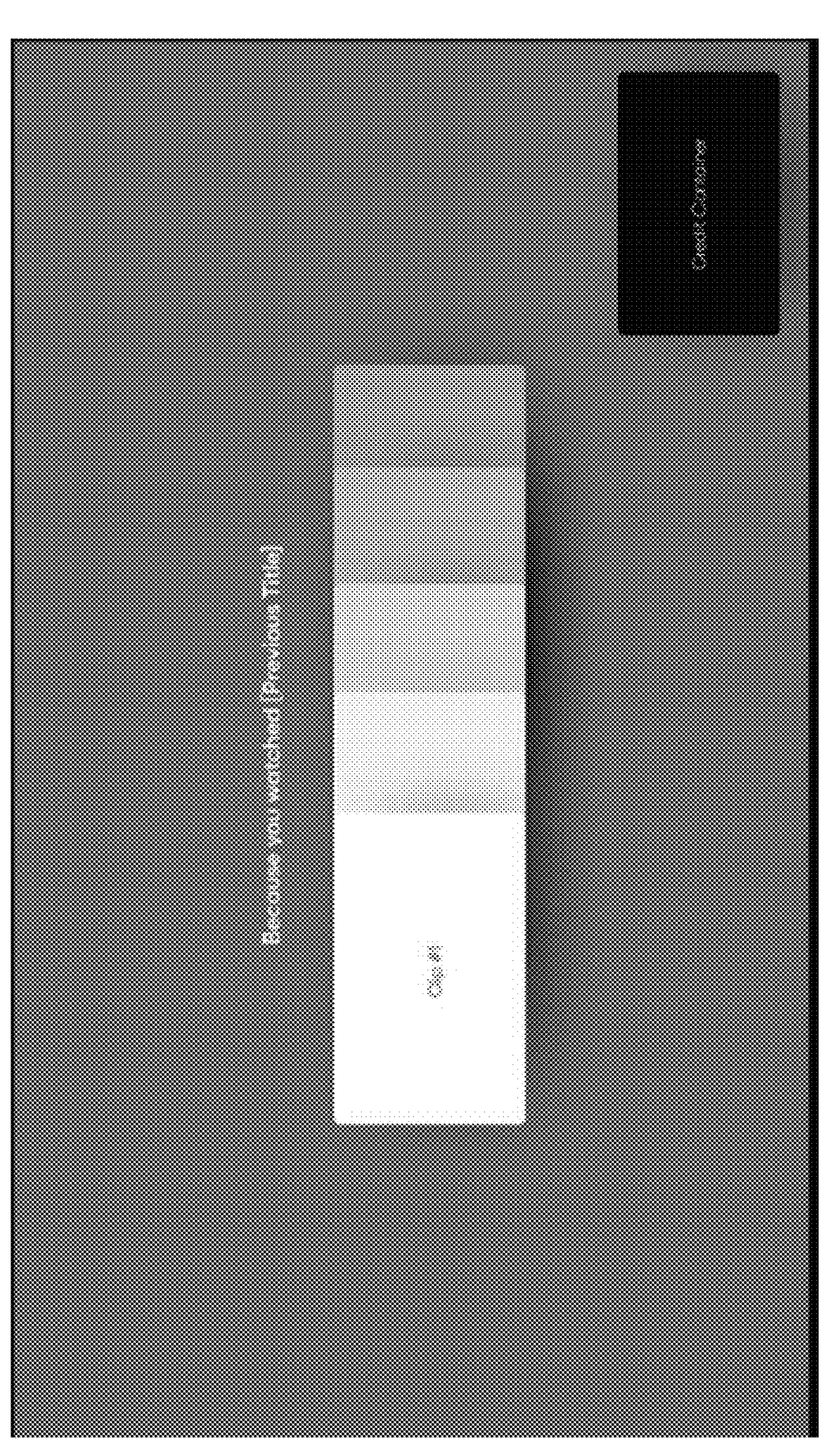
FIGS. 8A-8F illustrate additional example user interfaces.

FIGS. 8A-8E illustrate the scenario where a user does not select a clip image. Referring to FIG. 8A, as similarly described with respect to FIG. 7A, a clip stack is displayed. A first image for a first item of content may optionally partially overlay a second image for a second item of content, the second image may partially over a third image for a third item of content, and so on. An explanation as to how the set of items of content was selected may be generated and displayed (e.g., "Because you watched [name of just completed item of content]). Optionally, credit information (e.g., title, lead actors, director, producer, studio, etc.) for an item of content whose preview is being played or about to be played may be accessed from an associated record stored in memory and/or from associated metadata, and may be transmitted to the user device for display.

In this example, the clips have not yet begun playing.

Figure 8B:
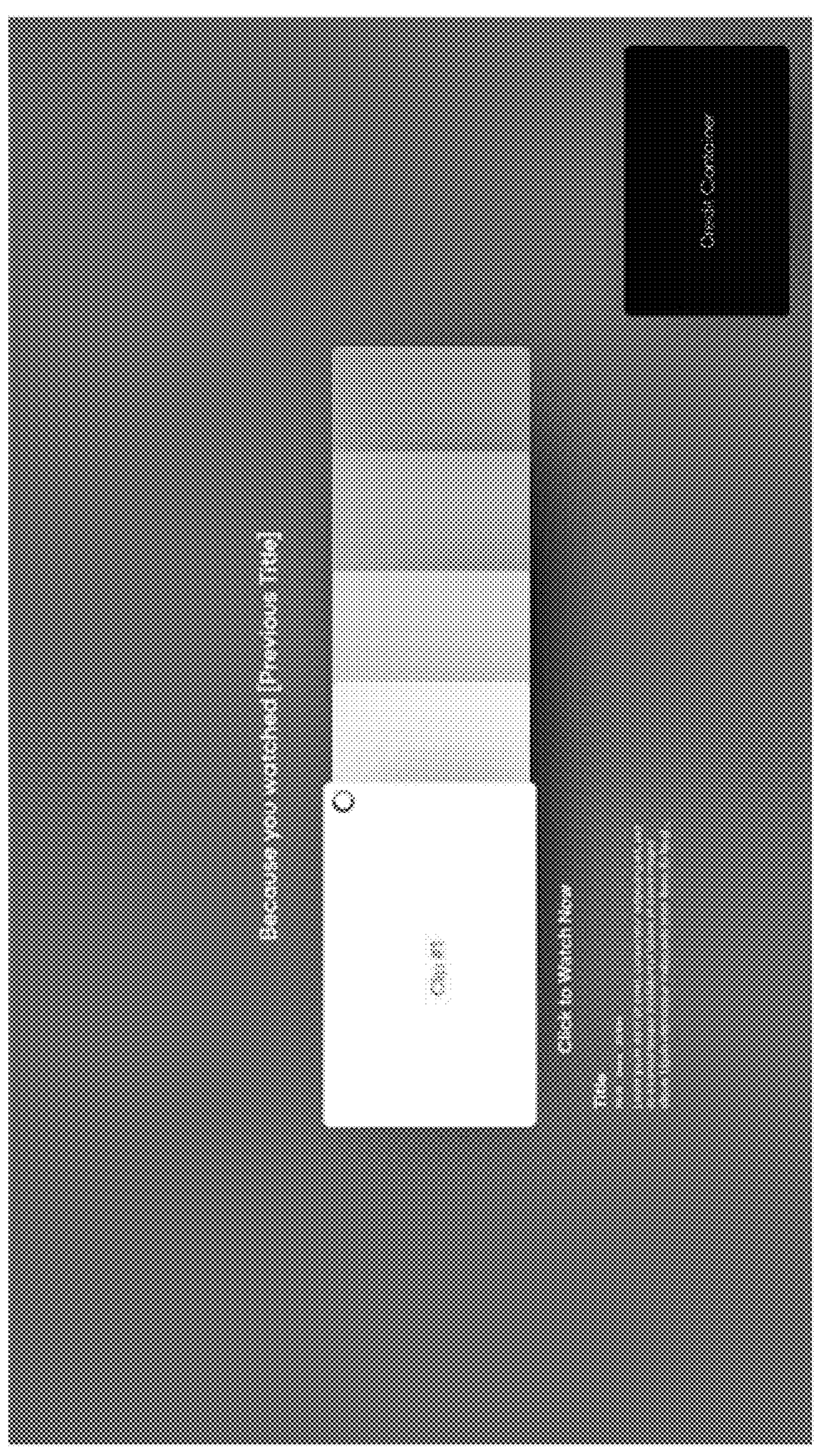
Figure 8C:
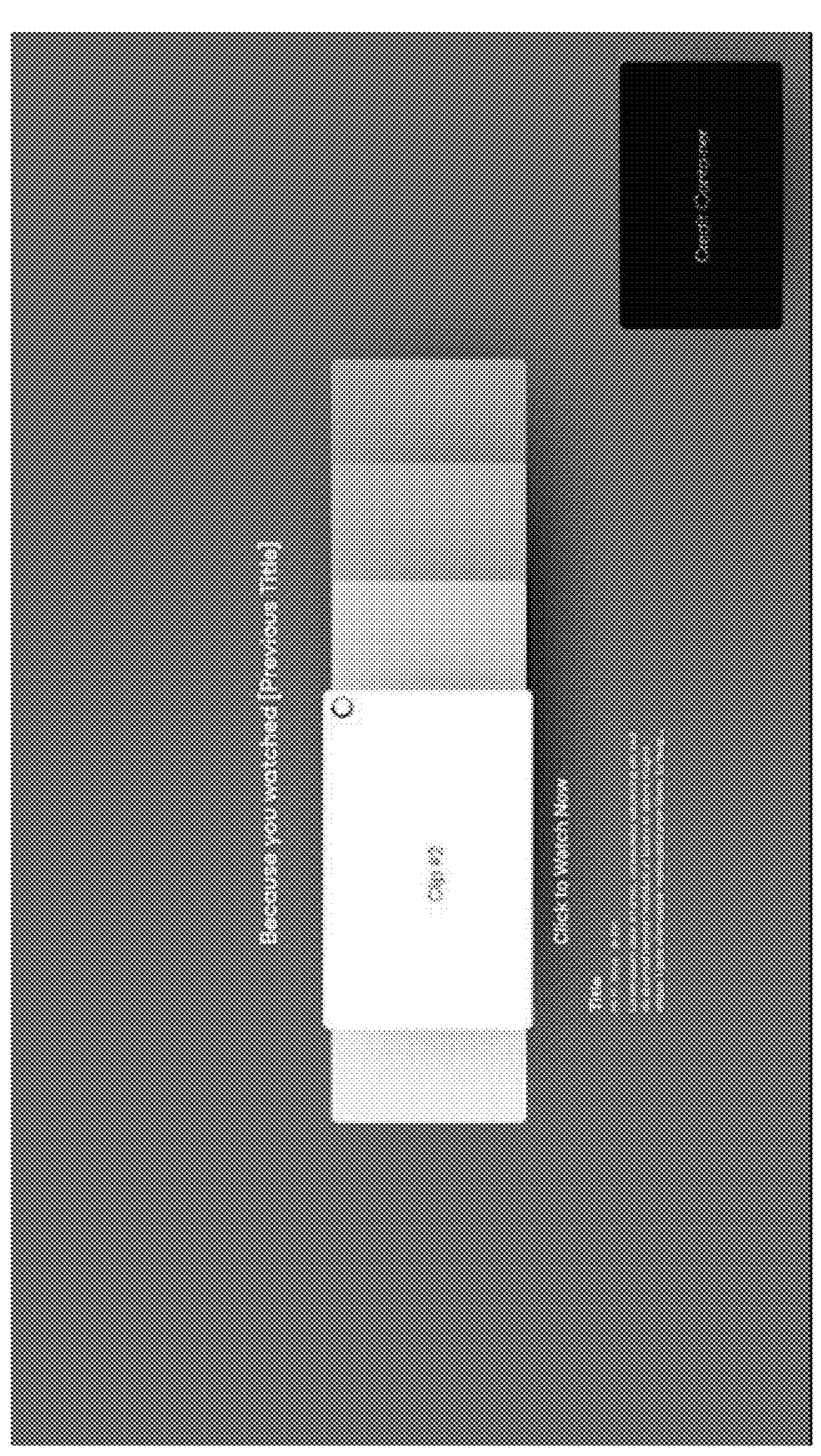

Referring to FIG. 8B, in this example, the first clip (Clip #1) begins playing, and the images corresponding to the items of content fan out. A prompt may be provided instructing the user to click on the clip currently playing to watch the item of content rather than the clip. If the user takes no action, an auto-advance process may be initiated, wherein once the first clip completes playing, the clip (clip #2) for the next item of content will begin playing as illustrated in FIG. 8C, wherein clip #2 moves to the foreground, while the other images corresponding to the other items of content move to the background. The process may continue in sequence if the user does not take any action.

Figure 8D:
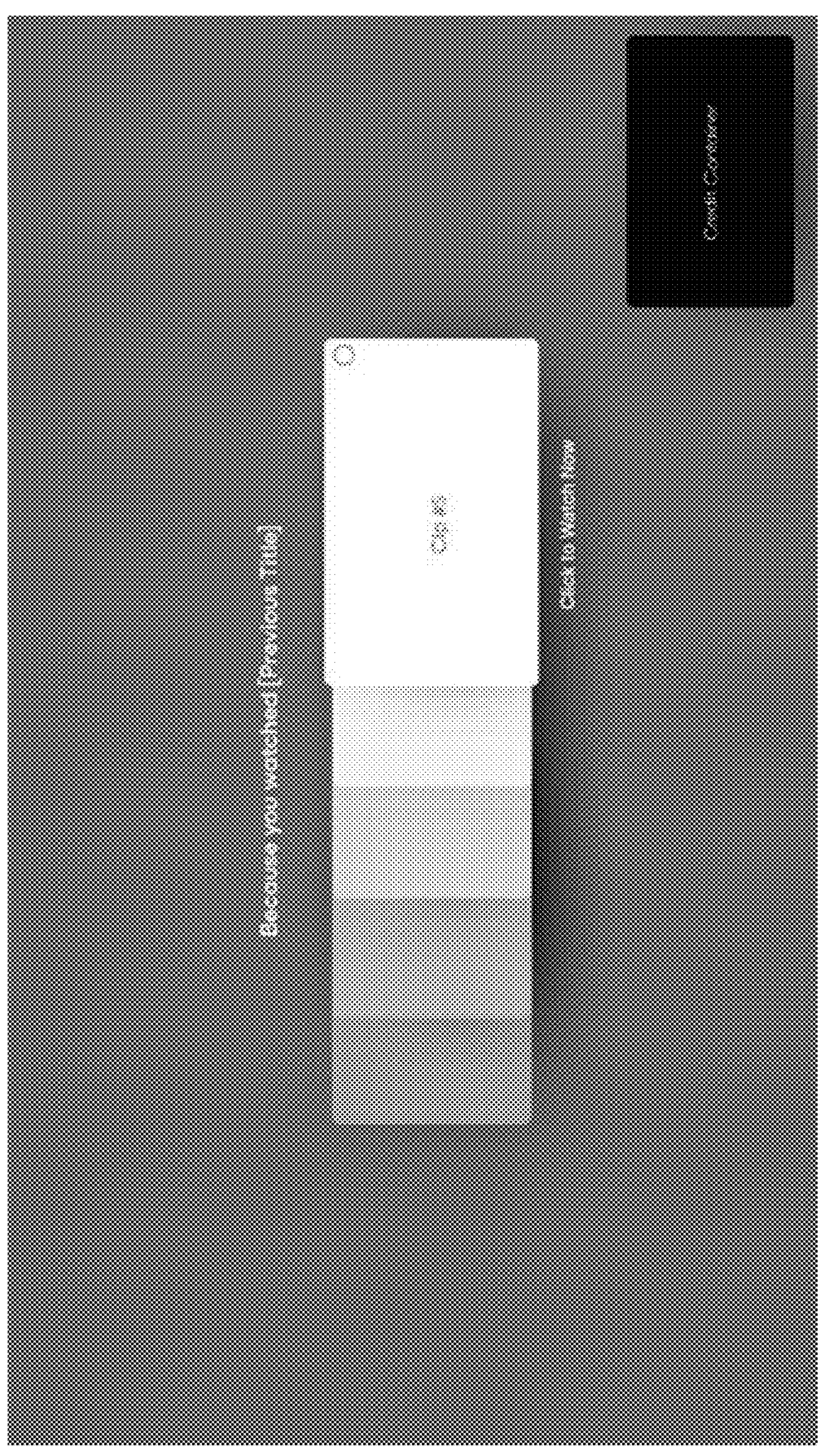

Referring to FIG. 8D, in this example, the last clip (Clip #5) begins playing. As in FIG. 7B, a prompt may be provided instructing the user to click on clip 5 to watch the fifth item of content corresponding to Clip #5 rather than the clip.

Figure 8E:
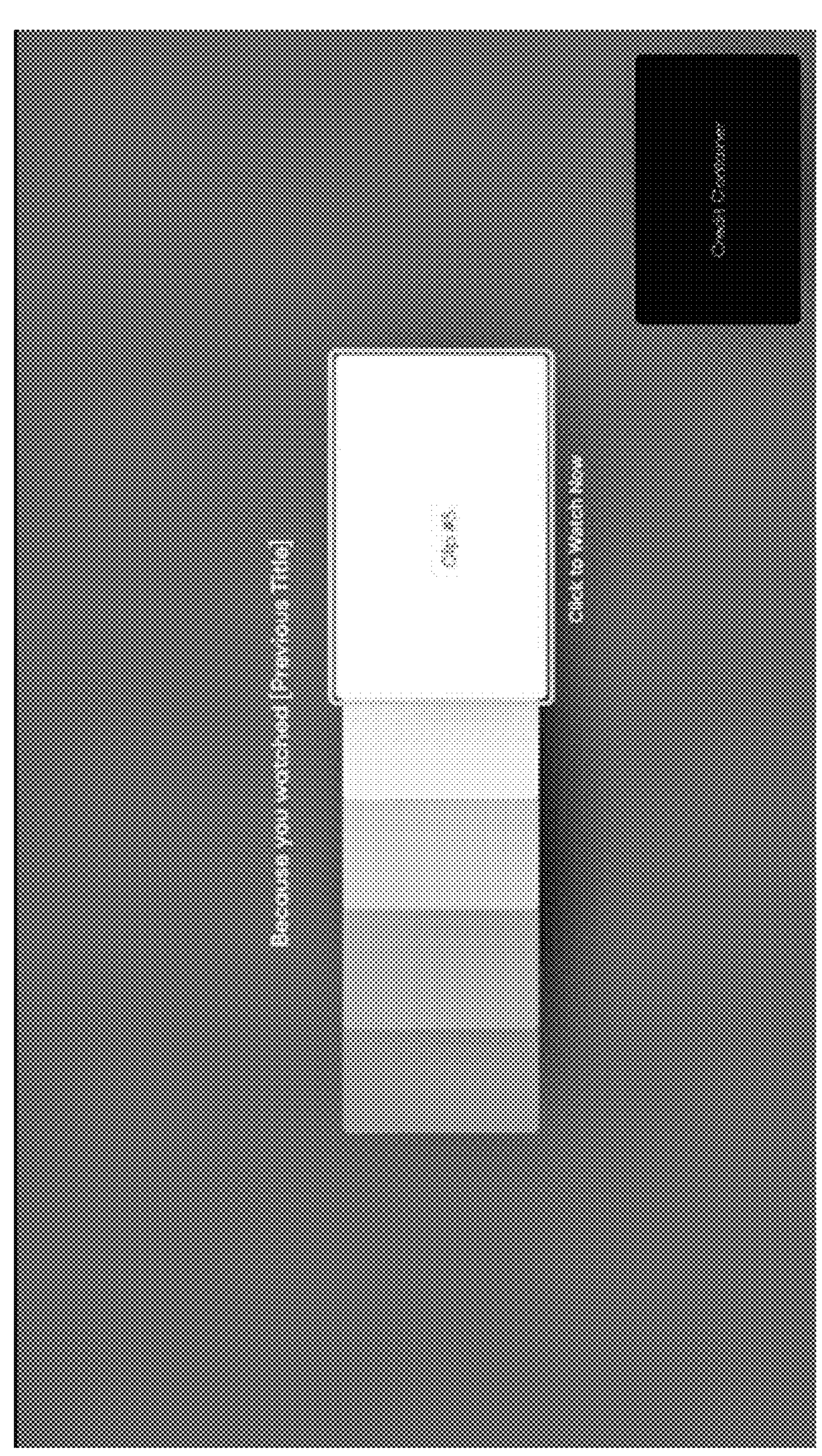

Once the last clip in the sequence is played, if the user does not take any action, the item of content corresponding to the last clip may automatically begin playing in full screen mode. Optionally, prior to playing the fifth item of content, the corresponding last clip (Clip #5 in this case), may be emphasized (e.g., with a boundary box or otherwise) as illustrated in FIG. 8E.

Figure 8F:
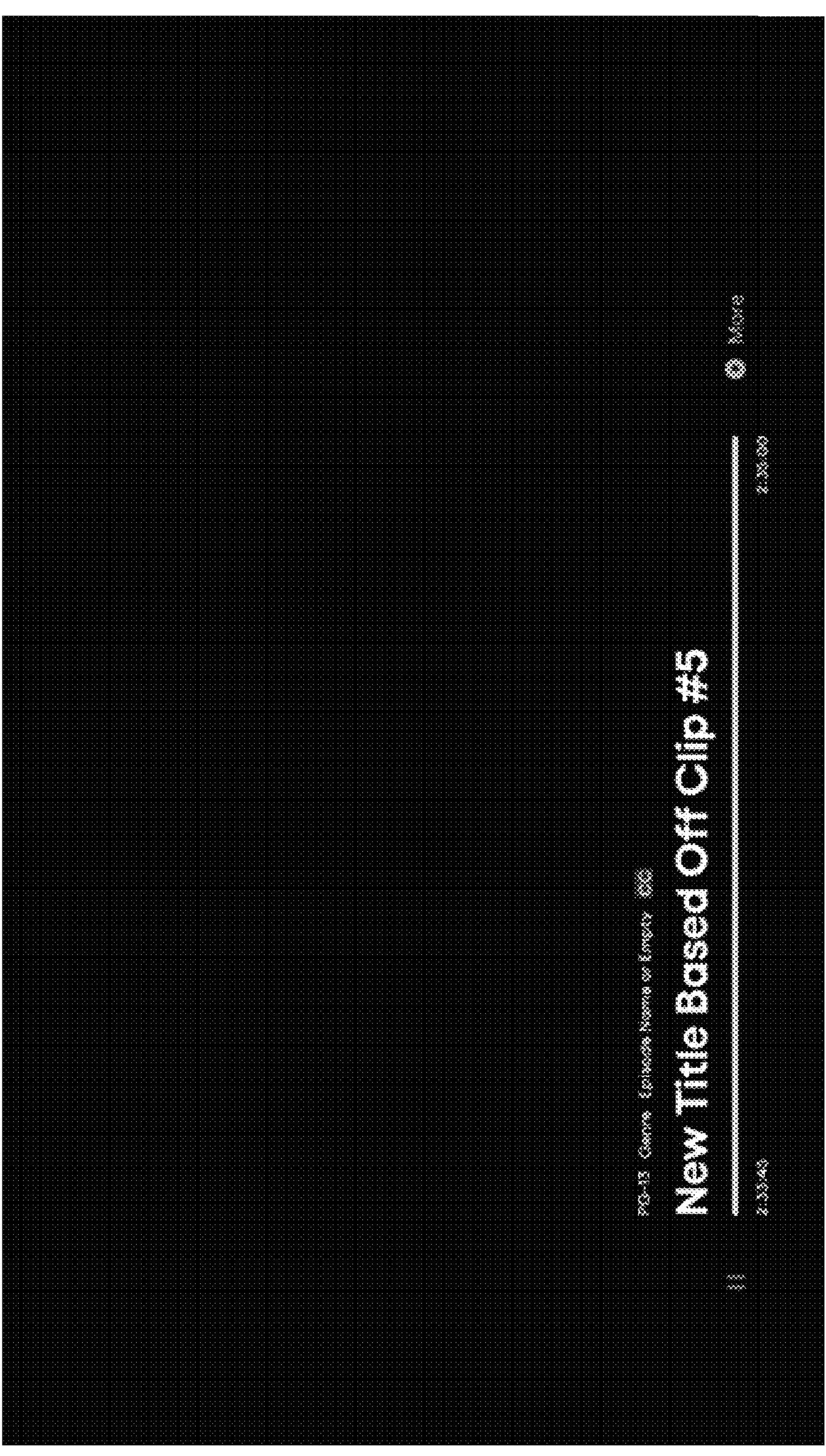

Optionally, there may be a transition screen displayed (e.g., the screen may fade to black) between the ending of the last clip playback and the beginning of the playing of the item of content corresponding to the last clip. The item of content corresponding to the last clip may be buffered by the user device while the transition screen is being displayed. Referring to FIG. 8F, the item of content corresponding to Clip #5 automatically begins playing. Optionally, certain data (e.g., metadata associated with the item of content) may be displayed overlaying the item of content for a specified period of time, after which the display of the data may cease. Such data may include a maturity rating (e.g., G, PG, PG-13, R, M, etc.), a genre, an episode name, an indication as to whether closed captioning is available, the title of the item of content, the total time length of the item of content, and the time remaining in the playback of the item of content. Optionally, a progress bar or scrubber may be displayed show, the current playback state. Optionally, a "more" control may be displayed which when selected, causes more related data to be accessed from memory and displayed.

Figure 9:
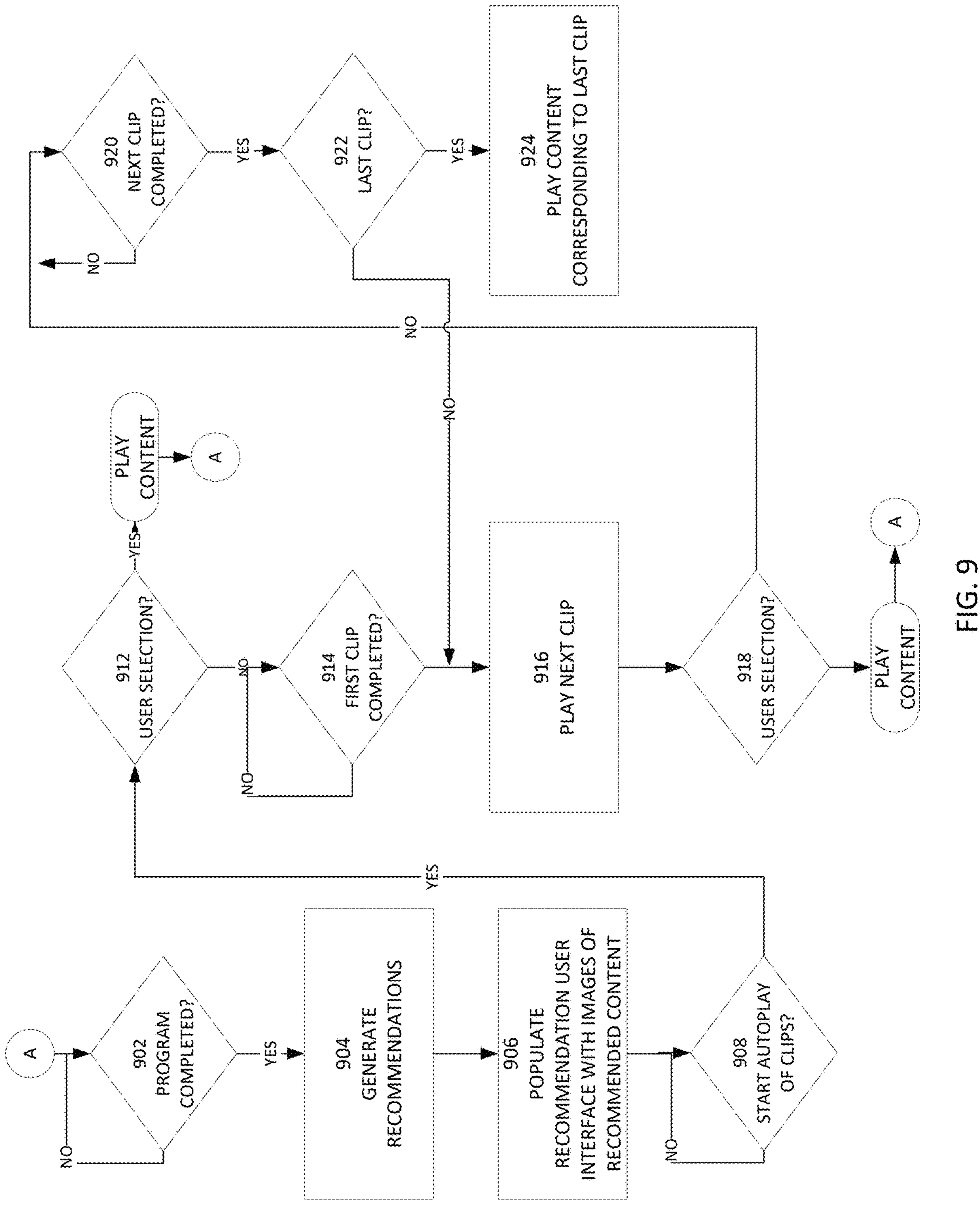
FIG. 9 illustrates an example process.

FIG. 9 illustrates an example process relating to the generation and interactivity of a clip stack. A video program (e.g., an item of primary content, such as a movie, an episode, a performance, a sporting event, etc.) being streamed by a system (such as the content composer and content transmission system described herein) to a user device and is being viewed by the user. At block 902, a determination is made as to whether the program has completed or is about to complete playing. For example, API calls and server logs may be used by the system to log user activity. Such logs may provide information about when a user starts and stops watching a program. Network traffic between the client and the streaming system may be analyzed to determine when the user has finished streaming. For example, a sudden drop in data transfer rate may indicate that the user has stopped streaming.

At block 904, a set of recommended programs may be generated. As discussed elsewhere in, the recommendations may be made based a similarity to the program the user had just viewed (e.g., programs of the same or similar genre, actors, storyline, etc.), based on collaborative filtering (items of content other users have viewed that also have watched the item of content just viewed by the user), the user's profile, viewing history, user like indications with respect to program, user dislike indications with respect to programs, user preferences (e.g., preferred and/or disfavored genres, subgenres, classifications (e.g., for mature audiences only, family friendly, violence, obscene language, sexual situations, smoking, drug use, alcohol use, etc.), actors, directors, screenwriters, languages, time lengths, sports teams, sporting events, musical performers, time of release (e.g., decade in which a content item was released), etc.), other data discussed herein, and/or other data. Other factors may be utilized in addition or instead in selecting the other items of content, such as date, time of day, geographical location, and/or the like. The number of recommendations may optionally be limited to a maximum number of recommendations. Optionally, a generated list of recommendations may be ordered or scored based on the likelihood the user would want to watch them, and the highest ranking programs (e.g., the top 3, 4, 5, 6, or 7 programs) may be selected.

At block 906, a recommendation user interface may be generated and rendered on the user device populated using some or all of the generated recommendations. For example, as illustrated in FIGS. 7A and 8A, a clip stack may be rendered comprising images corresponding to the recommended programs. As similarly discussed elsewhere herein, the images (the clip stack) may sequentially overlap of may be spaced apart.

A block 908, a determination may be made as to whether the autoplay of the clips should begin. For example, there may be a specified delay time between the presentation of the clip stack and the beginning of the playing of the first clip. By way of further example, the delay may correspond to the time it takes to transmit to and buffer by the user device some or all of the clips.

If a determination is made that the autoplay of the clips is to begins, the play of the first clip is initiated. At block 912, a determination may be made as to whether the user selected a clip. If the user selected a clip, the corresponding video program may begin playing in full screen mode, wherein the program is streamed from the system from the user device. Optionally, prior to playing the program, a fade-to-black transition screen may be displayed. The process may then proceed to block 902.

If the user did not select a clip, a determination may be made at block 914, as to whether the first clip has completed playing. At least partly in response to determining the first clip has completed playing, at block 916, the next clip in the clip stack will begin playing.

At block 918, a determination may be made as to whether the user selected a clip. If the user selected a clip, the corresponding video program may begin playing in full screen mode, wherein the program is streamed from the system from the user device. The process may then proceed to block 902. Optionally, prior to playing the program, a fade-to-black transition screen may be displayed.

At block 920, if the user did not select a clip, a determination may be made at block 920, as to whether the current clip has completed playing. At least partly in response to determining the current clip has completed playing, a determination may be made at block 922 as to whether the clip that just completed playing is the last clip in the stack clip of recommended programs. If the clip is the last clip in the stack clip, at block 924 the program corresponding to the last clip may automatically begin playing in full screen mode.

Thus, an aspect of the present disclosure relates to an efficient content navigation interface that combines program previews with intuitive navigation tools. A further aspect of the present disclosure relates to the utilization of heuristics and learning engines to generate customized previews for a given user or set of users. Yet a further aspect relates to synchronizing the displayed of augmented reality data. As described herein, the foregoing aspects advantageously reduce computer and network utilization while providing an enhanced navigation and content discovery experience for the user.

An aspect of the disclosure related to methods and systems configured to distribute interactive media, such as videos, streamed or downloaded over a network and to enable efficient content discovery. An aspect relates to enabling a user to interactively navigate through representations of video content by drilling up to broader genre categories or down to narrower genre categories. An aspect relates to the generation of customized content from existing content using a learning engine and user characteristics. The learning engine may comprise a neural network.

Another aspect of the present disclosure relates to a system configured to provide distribution of video content over a network, the system comprising: a computer device; a network interface; non-transitory computer readable memory having program instructions stored thereon that when executed by the computer device cause the system to perform operations comprising: select a first set of content items associated with a first genre; cause representations of the first set of content items associated with a first genre to populate a first user interface on a first user device of a first user; detect, via communication received over a network via the network interface, a user activation of a drill up control displayed in association with representations of the first set of content items; at least partly in response to detecting activation of the drill up control, selecting a second set of content items associated with a second genre, the second genre broader than and including the first genre; cause representations of the second set of content items associated with a second genre to populate the first user interface on the first user device; detect a user activation of a drill down control displayed in association with representations of the second set of content items; at least partly in response to detecting activation of the drill down control, selecting, from a set of a plurality of genres narrower than the second genre, a third set of content items associated with one or more genres from the set of the plurality of genres narrower than the second genre; cause representations of the third set of content items associated with a second genre to populate the first user interface on the first user device.

Another aspect of the present disclosure relates to a computer implemented method, the method comprising: selecting, using a computer system a first set of content items associated with a first genre; causing, using the computer system, representations of the first set of content items associated with a first genre to populate a first user interface on a first user device of a first user; detecting, using the computer system, a user activation of a drill up control while the representations of the first set of content items are displayed by the first user device; at least partly in response to detecting activation of the drill up control while the representations of the first set of content items are displayed by the first user device, selecting, by the computer system, a second set of content items associated with a second genre, the second genre broader than and including the first genre; causing, using the computer system, representations of the second set of content items associated with a second genre to populate the first user interface on the first user device; detecting, using the computer system, a user activation of a drill down control displayed while the representations of the second set of content items are displayed by the first user device; at least partly in response to detecting activation of the drill down control, selecting by computer system, from a set of a plurality of genres narrower than the second genre, a third set of content items associated with one or more genres from the set of the plurality of genres narrower than the second genre; causing representations of the third set of content items associated with a second genre to populate the first user interface on the first user device.

Another aspect of the present disclosure relates to a non-transitory computer readable memory having program instructions stored thereon that when executed by a computing device cause the computing device to perform operations comprising: selecting a first set of content items associated with a first genre; causing representations of the first set of content items associated with a first genre to populate a first user interface on a first user device of a first user; detecting a user activation of a drill up control while the representations of the first set of content items are displayed by the first user device; at least partly in response to detecting activation of the drill up control while the representations of the first set of content items are displayed by the first user device, selecting a second set of content items associated with a second genre, the second genre broader than and including the first genre; causing representations of the second set of content items associated with a second genre to populate the first user interface on the first user device.

An aspect of the present disclosure relates to a system configured to provide distribution of video content and augmented reality data over a network, the system comprising: a computer device; a network interface; non-transitory computer readable memory having program instructions stored thereon that when executed by the computer device cause the system to perform operations comprising: embed optical codes are corresponding frames of a video content item; associate metadata triggers with corresponding optical codes; cause the video content item to be streamed to a connected television associated with a user; detect a metadata trigger; at least partly in response to detecting the metadata trigger, transmit a communication to an electronic destination associated with the user regarding an upcoming item of augmented reality content; detect that a camera of a user device, different than the connected television, is imaging the optical code; at least partly in response to detecting that the camera of the user device, different than the connected television, is imaging the video content item, including the optical code, cause the augmented reality data to be displayed by a display of the user device in association with an image of the video content. The optical code may optionally be visually imperceptible to user.

An aspect of the present disclosure relates to a system, the system comprising: a computer device; a network interface; non-transitory computer readable memory having program instructions stored thereon that when executed by the computer device cause the system to perform operations comprising: embed optical codes are corresponding frames of a video content item; cause the video content item to be streamed to a connected television associated with a user; transmit a communication to an electronic destination associated with the user regarding an item of augmented reality content; detect that a camera of a user device, different than the connected television, is imaging the optical code; at least partly in response to detecting that the camera of the user device, different than the connected television, is imaging the video content item, including the optical code, cause the augmented reality data to be displayed by a display of the user device in association with an image of the video content. The optical code may optionally be visually imperceptible to user.

An aspect of the present disclosure relates to a system configured to provide distribution of video content over a network, the system comprising: a computer device; a network interface; non-transitory computer readable memory having program instructions stored thereon that when executed by the computer device cause the system to perform operations comprising: stream a program via the network interface over a network to a user device remote from the system; determine that an end of the program has or is being streamed to the user device; generate a set of recommended programs based at least in part on characteristics of the program; access from memory respective images corresponding to recommended programs in the set of recommended programs; cause a user interface to be presented on the user device populated with the images corresponding to the recommended programs in the set of recommended programs; automatically cause a playback sequence of a set of video clips corresponding to the set of recommended programs to begin, wherein the images corresponding to the recommended programs in the set of recommended programs are displayed while a clip is currently playing, excluding an image corresponding to the currently playing clip; and at least partly in response to detecting a selection of a first control during playback of a given clip in the set of video clips, cause the given clip to cease playing and cause a program corresponding to the given clip to be streamed to the user device and to begin playing in full screen mode.

Optionally, the operations further comprising: causing a transition screen to be displayed between the detection of the selection of the first control and the playing of the given clip in full screen mode, wherein the user device is enabled to buffer the program corresponding to the given clip while the transition screen is displayed between the detection of the selection of the first control and the playing of the given clip in full screen mode. Optionally, generating a set of recommended programs based at least in part on characteristics of the program further comprises generating the set of recommended programs based in part on feedback provided by the user for previously viewed programs. Optionally, causing a user interface to be presented on the user device populated with the images corresponding to the recommended programs in the set of recommended programs further comprises causing the images to be displayed in a fanned out, partially overlapping configuration, wherein when a given clip is playing it is caused to play in a foreground while images corresponding to the set of recommended programs are displayed in a background. Optionally, generating a set of recommended programs based at least in part on characteristics of the program further comprises generating the set of recommended programs based in part on feedback provided by the user for previously viewed programs. Optionally, the operations further comprise: stream a second program via the network interface over the network to the user device remote from the system; determine that an end of the second program has or is being streamed to the user device; generate a second set of recommended programs based at least in part on characteristics of the second program; access respective images corresponding to recommended programs in the second set of recommended programs; cause the user interface to be presented on the user device populated with the images corresponding to the recommended programs in the second set of recommended programs; automatically cause a second playback sequence of a second set of video clips corresponding to the second set of recommended programs to begin, wherein images corresponding to the recommended programs in the second set of recommended programs are displayed while a given clip in the second set of video clips is currently playing, excluding an image corresponding to the currently playing given clip in the second set of video clips; and at least partly in response to detecting a selection of the first control during playback of the given clip in the second set of video clips, cause the given clip in the second set of video clips to cease playing and cause a corresponding program to the given clip in the second set of video clips to be streamed to the user device and to begin playing in full screen mode. Optionally, selection of the first control further comprises selecting the given clip in the set of video clips while the given clip is playing.

An aspect of the present disclosure relates to a computer implemented method, the method comprising: streaming a program from a server via a network interface over a network to a user device; generating a set of recommended programs based at least in part on characteristics of the program; accessing respective images corresponding to recommended programs in the set of recommended programs; causing a user interface to be presented on the user device populated with the images corresponding to the recommended programs in the set of recommended programs; automatically causing a playback sequence of a set of video clips corresponding to the set of recommended programs to begin, wherein the images corresponding to the recommended programs; and at least partly in response to detecting a selection of a first control during playback of a given clip in the set of video clips, causing the given clip to cease playing and cause a program corresponding to the given clip to be streamed to the user device and to begin playing in full screen mode.

Optionally, the method further comprises: causing a transition screen to be displayed between the detection of the selection of the first control and the playing of the given clip in full screen mode, wherein the user device is enabled to buffer the program corresponding to the given clip while the transition screen is displayed between the detection of the selection of the first control and the playing of the given clip in full screen mode. Optionally, generating a set of recommended programs based at least in part on characteristics of the program further comprises generating the set of recommended programs based in part on feedback provided by the user for previously viewed programs. Optionally, wherein causing a user interface to be presented on the user device populated with the images corresponding to the recommended programs in the set of recommended programs further comprises causing the images to be displayed in a fanned out, partially overlapping configuration, wherein when a given clip is playing it is caused to play in a foreground while images corresponding to the set of recommended programs are displayed in a background. Optionally, generating a set of recommended programs based at least in part on characteristics of the program further comprises generating the set of recommended programs based in part on feedback provided by the user for previously viewed programs. Optionally, the method further comprises: streaming a second program to the user device; generating a second set of recommended programs based at least in part on characteristics of the second program; accessing respective images corresponding to recommended programs in the second set of recommended programs; causing the user interface to be presented on the user device populated with the images corresponding to the recommended programs in the second set of recommended programs; automatically causing a second playback sequence of a second set of video clips corresponding to the second set of recommended programs to begin, wherein images corresponding to the recommended programs in the second set of recommended programs are displayed while a given clip in the second set of video clips is currently playing, excluding an image corresponding to the currently playing given clip in the second set of video clips; and at least partly in response to detecting a selection of the first control during playback of the given clip in the second set of video clips, causing the given clip in the second set of video clips to cease playing and cause a corresponding program to the given clip in the second set of video clips to be streamed to the user device and to begin playing in full screen mode. Optionally, selection of the first control further comprises selecting the given clip in the set of video clips while the given clip is playing.

An aspect of the present disclosure relates to non-transitory computer readable memory having program instructions stored thereon that when executed by a computing device cause the computing device to perform operations comprising: stream a program to a user device; generate a set of recommended programs based at least in part on characteristics of the program; access respective images corresponding to recommended programs in the set of recommended programs; cause a user interface to be presented on the user device populated with the images corresponding to the recommended programs in the set of recommended programs; automatically cause a playback sequence of a set of video clips corresponding to the set of recommended programs to begin, wherein the images corresponding to the recommended programs in the set of recommended programs are displayed while a clip is currently playing, excluding an image corresponding to the currently playing clip; and at least partly in response to detecting a selection of a first control during playback of a given clip in the set of video clips, cause the given clip to cease playing and cause a program corresponding to the given clip to be streamed to the user device and to begin playing in full screen mode.

Optionally, the operations further comprise: causing a transition screen to be displayed between the detection of the selection of the first control and the playing of the given clip in full screen mode, wherein the user device is enabled to buffer the program corresponding to the given clip while the transition screen is displayed between the detection of the selection of the first control and the playing of the given clip in full screen mode. Optionally, generating a set of recommended programs based at least in part on characteristics of the program further comprises generating the set of recommended programs based in part on feedback provided by the user for previously viewed programs. Optionally, causing a user interface to be presented on the user device populated with the images corresponding to the recommended programs in the set of recommended programs further comprises causing the images to be displayed in a fanned out, partially overlapping configuration, wherein when a given clip is playing it is caused to play in a foreground while images corresponding to the set of recommended programs are displayed in a background. Optionally, generating a set of recommended programs based at least in part on characteristics of the program further comprises generating the set of recommended programs based in part on feedback provided by the user for previously viewed programs. Optionally, the operations further comprising: stream a second program to the user device; determine that an end of the second program has or is being streamed to the user device; generate a second set of recommended programs based at least in part on characteristics of the second program; access respective images corresponding to recommended programs in the second set of recommended programs; cause the user interface to be presented on the user device populated with the images corresponding to the recommended programs in the second set of recommended programs; automatically cause a second playback sequence of a second set of video clips corresponding to the second set of recommended programs to begin, wherein images corresponding to the recommended programs in the second set of recommended programs are displayed while a given clip in the second set of video clips is currently playing, excluding an image corresponding to the currently playing given clip in the second set of video clips; and at least partly in response to detecting a selection of the first control during playback of the given clip in the second set of video clips, cause the given clip in the second set of video clips to cease playing and cause a corresponding program to the given clip in the second set of video clips to be streamed to the user device and to begin playing in full screen mode. determine that an end of the second program has or is being streamed to the user device. Optionally, selection of the first control further comprises selecting the given clip in the set of video clips while the given clip is playing.

Thus, as described herein, systems and methods are disclosed that overcome the technical problems related to discovering content, navigating content libraries, and the generation of content previews.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop-down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the systems, devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system configured to provide distribution of video content over a network, the system comprising:

a computer device;

a network interface; and non-transitory computer readable memory having program instructions stored thereon that when executed by the computer device cause the system to perform operations comprising:

receive a request for a program via the network interface over a network from a user device remote from the system;

at least partly in response to receiving the request, generate a corresponding manifest comprising a plurality of entries;

transmit the manifest to the user device;

stream the program via the network interface over the network to the user device remote from the system at least partly in response to a request made by the user device using one or more manifest entries;

determine that an end of the program has or is being streamed to the user device;

generate a plurality of different versions of previews comprising different sets of video clips for a given program in a plurality of programs based at least in part on a maximum permitted clip length and a maximum permitted preview length;

generate a set of recommended programs from the plurality of programs based at least in part on characteristics of the program;

access from memory respective images corresponding to recommended programs in the set of recommended programs;

cause a user interface to be presented on the user device populated with the images corresponding to the recommended programs in the set of recommended programs;

select respective versions of previews from the plurality of different versions of previews for the recommended programs based on at least one user characteristic;

automatically cause a playback sequence of the selected respective versions of previews corresponding to the set of recommended programs to begin, wherein the images corresponding to the recommended programs in the set of recommended programs are displayed while a preview is currently playing, excluding an image corresponding to the currently playing preview; and at least partly in response to detecting a selection of a first control during playback of a given preview in the selected respective versions of previews, cause the given preview to cease playing and cause a program corresponding to the given preview to be streamed to the user device and to begin playing in full screen mode.

2. The system as defined in claim 1, the operations further comprising:

causing a transition screen to be displayed between the detection of the selection of the first control and the playing of the program corresponding to the given preview in full screen mode, wherein the user device is enabled to buffer the program corresponding to the given preview while the transition screen is displayed between the detection of the selection of the first control and the playing of the program corresponding to the given preview in full screen mode.

3. The system as defined in claim 1, wherein generating a set of recommended programs based at least in part on characteristics of the program further comprises generating the set of recommended programs based in part on feedback provided by the user for previously viewed programs.

4. The system as defined in claim 1, wherein causing a user interface to be presented on the user device populated with the images corresponding to the recommended programs in the set of recommended programs further comprises causing the images to be displayed in a fanned out, partially overlapping configuration, wherein when a given preview is playing it is caused to play in a foreground while images corresponding to the set of recommended programs are displayed in a background.

5. The system as defined in claim 1, wherein generating a set of recommended programs is based in part on a geographic area of the user device, and wherein the set of recommended programs is limited to a maximum number of programs.

6. The system as defined in claim 1, the operations further comprising:

stream a second program via the network interface over the network to the user device remote from the system;

determine that an end of the second program has or is being streamed to the user device;

generate a second set of recommended programs based at least in part on characteristics of the second program;

access respective images corresponding to recommended programs in the second set of recommended programs;

cause the user interface to be presented on the user device populated with the images corresponding to the recommended programs in the second set of recommended programs;

automatically cause a second playback sequence of a second set of respective versions of previews corresponding to the second set of recommended programs to begin, wherein images corresponding to the recommended programs in the second set of recommended programs are displayed while a given preview in the second set of respective versions of previews is currently playing, excluding an image corresponding to the currently playing given preview in the second set of respective versions of previews; and at least partly in response to detecting a selection of the first control during playback of the given preview in the second set of respective versions of previews, cause the given preview in the second set of respective versions of previews to cease playing and cause a corresponding program to the given preview in the second set of respective versions of previews to be streamed to the user device and to begin playing in full screen mode.

7. The system as defined in claim 1, wherein selection of the first control further comprises selecting the given preview while the given preview is playing.

8. A computer implemented method, the method comprising:

receiving a request for a program via a network interface over a network from a user device;

at least partly in response to receiving the request, transmitting a corresponding manifest comprising a plurality of entries to the user device;

streaming the program from a server via the network interface over the network to the user device at least partly in response to a request made by the user device using one or more manifest entries;

generating a plurality of different versions of previews comprising different sets of video clips for a given program in a plurality of programs based at least in part on a maximum permitted clip length and a maximum permitted preview length;

generating a set of recommended programs from the plurality of programs based at least in part on characteristics of the program;

accessing respective images corresponding to recommended programs in the set of recommended programs;

causing a user interface to be presented on the user device populated with the images corresponding to the recommended programs in the set of recommended programs;

selecting respective versions of previews from the plurality of different versions of previews for the recommended programs based on at least one user characteristic;

automatically causing a playback sequence of the selected respective versions of previews corresponding to the set of recommended programs to begin; and at least partly in response to detecting a selection of a first control during playback of a given preview in the selected respective versions of previews, causing the given preview to cease playing and cause a program corresponding to the given preview to be streamed to the user device and to begin playing in full screen mode.

9. The method as defined in claim 8, the method further comprising:

causing a transition screen to be displayed between the detection of the selection of the first control and the playing of the program corresponding to the given preview in full screen mode, wherein the user device is enabled to buffer the program corresponding to the given preview while the transition screen is displayed between the detection of the selection of the first control and the playing of the program corresponding to the given preview in full screen mode.

10. The method as defined in claim 8, wherein generating a set of recommended programs based at least in part on characteristics of the program further comprises generating the set of recommended programs based in part on feedback provided by the user for previously viewed programs.

11. The method as defined in claim 8, wherein causing a user interface to be presented on the user device populated with the images corresponding to the recommended programs in the set of recommended programs further comprises causing the images to be displayed in a fanned out, partially overlapping configuration, wherein when a given preview is playing it is caused to play in a foreground while images corresponding to the set of recommended programs are displayed in a background.

12. The method as defined in claim 8, wherein generating a set of recommended programs is based in part on a geographic area of the user device, and wherein the set of recommended programs is limited to a maximum number of programs.

13. The method as defined in claim 8, the method further comprising:

streaming a second program via the network interface over the network to the user device;

generating a second set of recommended programs based at least in part on characteristics of the second program;

accessing respective images corresponding to recommended programs in the second set of recommended programs;

causing the user interface to be presented on the user device populated with the images corresponding to the recommended programs in the second set of recommended programs;

automatically causing a second playback sequence of a second set of respective versions of previews corresponding to the second set of recommended programs to begin, wherein images corresponding to the recommended programs in the second set of recommended programs are displayed while a given preview in the second set of respective versions of previews is currently playing, excluding an image corresponding to the currently playing given preview in the second set of respective versions of previews; and at least partly in response to detecting a selection of the first control during playback of the given preview in the second set of respective versions of previews, causing the given preview in the second set of respective versions of previews to cease playing and cause a corresponding program to the given preview in the second set of respective versions of previews to be streamed to the user device and to begin playing in full screen mode.

14. The method as defined in claim 8, wherein selection of the first control further comprises selecting the given preview while the given preview is playing.

15. Non-transitory computer readable memory having program instructions stored thereon that when executed by a computing device cause the computing device to perform operations comprising:

receive a request for a program from a user device;

at least partly in response to receiving the request, transmit a corresponding manifest comprising a plurality of entries to the user device;

stream the program to the user device at least partly in response to a request made by the user device using one or more manifest entries;

generate a plurality of different versions of previews comprising different sets of video clips for a given program in a plurality of programs based at least in part on a maximum permitted clip length and a maximum permitted preview length;

generate a set of recommended programs from the plurality of programs based at least in part on characteristics of the program;

access respective images corresponding to recommended programs in the set of recommended programs;

cause a user interface to be presented on the user device populated with the images corresponding to the recommended programs in the set of recommended programs;

select respective versions of previews from the plurality of different versions of previews for the recommended programs based on at least one user characteristic;

automatically cause a playback sequence of the selected respective versions of previews corresponding to the set of recommended programs to begin, wherein the images corresponding to the recommended programs in the set of recommended programs are displayed while a preview is currently playing, excluding an image corresponding to the currently playing preview; and at least partly in response to detecting a selection of a first control during playback of a given preview in the selected respective versions of previews, cause the given preview to cease playing and cause a program corresponding to the given preview to be streamed to the user device and to begin playing in full screen mode.

16. The non-transitory computer readable memory as defined in claim 15, the operations further comprising:

causing a transition screen to be displayed between the detection of the selection of the first control and the playing of the program corresponding to the given preview in full screen mode, wherein the user device is enabled to buffer the program corresponding to the given preview while the transition screen is displayed between the detection of the selection of the first control and the playing of the program corresponding to the given preview in full screen mode.

17. The non-transitory computer readable memory as defined in claim 15, wherein generating a set of recommended programs based at least in part on characteristics of the program further comprises generating the set of recommended programs based in part on feedback provided by the user for previously viewed programs.

18. The non-transitory computer readable memory as defined in claim 15, wherein causing a user interface to be presented on the user device populated with the images corresponding to the recommended programs in the set of recommended programs further comprises causing the images to be displayed in a fanned out, partially overlapping configuration, wherein when a given preview is playing it is caused to play in a foreground while images corresponding to the set of recommended programs are displayed in a background.

19. The non-transitory computer readable memory as defined in claim 15, wherein generating a set of recommended programs is based in part on a geographic area of the user device, and wherein the set of recommended programs is limited to a maximum number of programs.

20. The non-transitory computer readable memory as defined in claim 15, the operations further comprising:

stream a second program to the user device;

determine that an end of the second program has or is being streamed to the user device;

generate a second set of recommended programs based at least in part on characteristics of the second program;

access respective images corresponding to recommended programs in the second set of recommended programs;

cause the user interface to be presented on the user device populated with the images corresponding to the recommended programs in the second set of recommended programs;

automatically cause a second playback sequence of a second set of respective versions of previews corresponding to the second set of recommended programs to begin, wherein images corresponding to the recommended programs in the second set of recommended programs are displayed while a given preview in the second set of respective versions of previews is currently playing, excluding an image corresponding to the currently playing given preview in the second set of respective versions of previews; and at least partly in response to detecting a selection of the first control during playback of the given preview in the second set of respective versions of previews, cause the given preview in the second set of respective versions of previews to cease playing and cause a corresponding program to the given preview in the second set of respective versions of previews to be streamed to the user device and to begin playing in full screen mode.

21. The non-transitory computer readable memory as defined in claim 15, wherein selection of the first control further comprises selecting the given preview while the given preview is playing.

* * * * *